United States Patent
Hawkes et al.

(10) Patent No.: US 11,082,846 B2
(45) Date of Patent: Aug. 3, 2021

(54) METHOD AND SYSTEM FOR ONBOARD EQUIPMENT MISBEHAVIOR DETECTION REPORT ROUTING

(71) Applicant: QUALCOMM Incorporated, San Diego, CA (US)

(72) Inventors: Philip Michael Hawkes, Valley Heights (AU); Anand Palanigounder, San Diego, CA (US); Michaela Vanderveen, Tracy, CA (US); James Alan Misener, Pacifica, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/355,593

(22) Filed: Mar. 15, 2019

(65) Prior Publication Data

US 2019/0297499 A1 Sep. 26, 2019

Related U.S. Application Data

(60) Provisional application No. 62/645,666, filed on Mar. 20, 2018.

(51) Int. Cl.
*H04W 12/069* (2021.01)
*H04W 40/20* (2009.01)
(Continued)

(52) U.S. Cl.
CPC .......... *H04W 12/069* (2021.01); *H04W 4/40* (2018.02); *H04W 12/02* (2013.01);
(Continued)

(58) Field of Classification Search
CPC ......... H04W 12/0609; H04W 12/0013; H04W 12/004; H04W 12/02; H04W 4/40;
(Continued)

(56) References Cited

U.S. PATENT DOCUMENTS

| 2005/0060070 A1* | 3/2005 | Kapolka | G07C 5/008 701/31.4 |
|---|---|---|---|
| 2016/0119151 A1* | 4/2016 | Park | H04L 9/3268 713/158 |
| 2016/0140842 A1* | 5/2016 | Park | G08G 1/052 340/905 |

OTHER PUBLICATIONS

International Search Report and Written Opinion—PCT/US2019/022745—ISA/EPO—dated Jun. 17, 2019, 12 pages.

* cited by examiner

*Primary Examiner* — Farid Seyedvosoghi
(74) *Attorney, Agent, or Firm* — Michael F. Taveira

(57) ABSTRACT

Methods, devices, non-transitory processor-readable media of various embodiments provide for routing Misbehavior Detection Reports from vehicle-to-everything (V2X) onboard equipment to an associated entity. Various embodiments may include storing, within a Misbehavior Report Router resulting from provisioning of a certificate to a V2X onboard equipment, information that enables a Misbehavior Detection Report to be routed to the entity associated with misbehaving V2X onboard equipment, examining a Misbehavior Detection Report received from a reporting V2X onboard equipment to identify a Pseudonym Certificate Authority Misbehavior Report Router of the entity associated with misbehaving V2X onboard equipment, passing the Misbehavior Detection Report to the identified Pseudonym Certificate Authority Misbehavior Report Router, using information in the Misbehavior Detection Report with information stored in the Pseudonym Certificate Authority Misbehavior Report Router to route the Misbehavior Detection Report to the associated entity.

30 Claims, 16 Drawing Sheets

(51) Int. Cl.
*H04W 12/02* (2009.01)
*H04W 4/40* (2018.01)
*H04W 12/033* (2021.01)
*H04W 12/40* (2021.01)
*H04L 29/06* (2006.01)

(52) U.S. Cl.
CPC ......... *H04W 12/033* (2021.01); *H04W 12/40* (2021.01); *H04W 40/20* (2013.01); *H04L 63/0823* (2013.01)

(58) Field of Classification Search
CPC . H04W 40/20; H04W 12/069; H04W 12/033; H04W 12/40; H04L 63/0823
USPC .......................... 455/411; 340/905; 713/158
See application file for complete search history.

METHOD AND SYSTEM FOR ONBOARD EQUIPMENT MISBEHAVIOR DETECTION REPORT ROUTING

RELATED APPLICATIONS

This application claims the benefit of priority to U.S. Provisional Application No. 62/645,666, entitled "Vehicle-to-Vehicle Onboard Equipment Misbehavior Detection Report Routing" filed Mar. 20, 2018, the entire contents of which are hereby incorporated by reference for all purposes.

BACKGROUND

The cellular vehicle-to-everything (C-V2X) protocol serves as the foundation for vehicle-based wireless communications, and may be used to support intelligent highways, autonomous and semi-autonomous vehicles, and improve the overall efficiency and safety of the highway transportation systems. C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V21), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc.

IEEE 1609 is the standard under development for vehicle-based communication systems and functionality. Part of that system is the ability for a vehicle to broadcast Basic Safety Messages ("BSM" in the figures) or Cooperative Awareness Messages (CAM) that other vehicles can receive and process to improve traffic safety. The processing of such messages in the transmitting and receiving vehicles occurs in onboard equipment that provide the V2X functionality (referred to herein as "V2X onboard equipment"). Thus, the integrity and functionality of V2X onboard equipment will be a significant design consideration as V2X systems are fielded.

SUMMARY

Various aspects include methods of routing misbehavior detection reports from vehicle-to-everything (V2X) or vehicle-to-vehicle (V2V) onboard equipment to an entity (e.g., Original Equipment Manufacturer, etc.) associated with the V2X onboard equipment, which may include routing a misbehavior detection report to the entity associated with the V2X onboard equipment based on a combination of information stored in a misbehavior report router (MRR) resulting from provisioning of a certificate to the V2X onboard equipment, and information included in the misbehavior detection report received from the V2X onboard equipment.

In some aspects, routing the misbehavior detection report to the entity associated with the V2X onboard equipment based on the combination of the information stored in the MRR resulting from the provisioning of the certificate to the V2X onboard equipment and the information included in the misbehavior detection report received from the V2X onboard equipment may include routing the misbehavior detection report based on at least one of the certificate issued to the V2X onboard equipment, an identity of a registration authority or entity that requested the provisioning of the certificate, or a certificate signing request identifier.

In some aspects, routing the misbehavior detection report to the entity associated with the V2X onboard equipment based on the combination of the information stored in the MRR resulting from the provisioning of the certificate to the V2X onboard equipment and the information included in the misbehavior detection report received from the V2X onboard equipment may include routing the misbehavior detection report based on pseudonym certificate information stored resulting from the provisioning of the certificate to the V2X onboard equipment.

Some aspects may further include storing, resulting from the provisioning of the certificate to the V2X onboard equipment, information that enables the misbehavior detection report to be routed to the entity associated with the V2X onboard equipment.

In some aspects, storing, resulting from the provisioning of the certificate to the V2X onboard equipment, the information that enables the misbehavior detection report to be routed to the entity associated with the V2X onboard equipment may include storing in a pseudonym certificate authority MRR for each of a plurality of certificates information identifying a registration authority that sent a certificate signing request (CSR) that initiated generation of the certificate, and a CSR identifier that identifies the CSR to the registration authority.

In some aspects, storing, during the provisioning of the certificate to the V2X onboard equipment, the information that enables the misbehavior detection report to be routed to the entity associated with the V2X onboard equipment may include storing in a registration authority MRR for each of a plurality of CSR identifiers information identifying a certificate provisioning backend that requested the certificate, and an onboard equipment identifier that identifies the V2X onboard equipment to the certificate provisioning backend.

In some aspects, storing, resulting from the provisioning of the certificate to the V2X onboard equipment, the information that enables the misbehavior detection report to be routed to the entity associated with the V2X onboard equipment further may include storing in a certificate provisioning backend MRR an onboard equipment identifier that identifies the V2X onboard equipment to a certificate provisioning backend.

In some aspects, routing the misbehavior detection report to the entity associated with the V2X onboard equipment based on the combination of the information stored in the MRR resulting from the provisioning of the certificate to the V2X onboard equipment and the information included in the misbehavior detection report received from the V2X onboard equipment may include identifying a registration authority, and a certificate signing request (CSR) identifier that identifies a corresponding CSR to the registration authority, routing the misbehavior detection report and CSR identifier to the registration authority, the registration authority identifying a certificate provisioning backend and an onboard equipment identifier that identifies the V2X onboard equipment, routing the misbehavior detection report and the onboard equipment identifier to the certificate provisioning backend, determining an identity of the V2X onboard equipment based on the misbehavior detection report and the onboard equipment identifier received in the certificate provisioning backend, and sending the determined identity of the V2X onboard equipment to the entity.

In some aspects, routing the misbehavior detection report to the entity associated with the V2X onboard equipment may include receiving the misbehavior detection report in a pseudonym certificate authority executing on a server computing device, identifying a pseudonym certificate associated with received misbehavior detection report by the pseudonym certificate authority executing on the server computing device, identifying by the pseudonym certificate authority executing on the server computing device a registration authority that sent a certificate signing request (CSR) that initiated generation of the pseudonym certificate and a certificate signing request identifier (CSR ID) of the CSR, and sending by the pseudonym certificate authority executing on the server computing device the CSR ID and the received misbehavior detection report to the identified registration authority.

In some aspects, routing the misbehavior detection report to the entity associated with the V2X onboard equipment may include receiving the misbehavior detection report, identifying a pseudonym certificate associated with received misbehavior detection report, determining a certificate provisioning backend request identifier (CPB Request ID) associated with the received misbehavior detection report, determining, an onboard equipment identifier of the V2X onboard equipment based on the CPB Request ID, and sending the onboard equipment identifier and the received misbehavior detection report to a misbehavior report catcher of the entity.

In some aspects, routing the misbehavior detection report to the entity associated with the V2X onboard equipment may include receiving the CSR ID and the misbehavior detection report in a registration authority executing on the server computing device, determining by the registration authority executing on the server computing device a certificate provisioning backend request identifier (CPB Request ID) of a certificate provisioning backend that requested a certificate for the received misbehavior detection report, sending by the registration authority executing on the server computing device the CPB Request ID and the received misbehavior detection report to the certificate provisioning backend, receiving in the certificate provisioning backend executing on the server computing device the CPB Request ID and the misbehavior detection report, determining by the certificate provisioning backend executing on the server computing device an onboard equipment identifier of the V2X onboard equipment based on the received CPB Request ID, and sending by the certificate provisioning backend executing on the server computing device the onboard equipment identifier and the received misbehavior detection report to a misbehavior report catcher of the entity.

In some aspects, routing the misbehavior detection report to the entity associated with the V2X onboard equipment may include receiving in a registration authority executing on the server computing device a certificate signing request identifier (CSR ID) and the misbehavior detection report, determining by the registration authority executing on the server computing device a certificate provisioning backend request identifier of a certificate provisioning backend that requested a certificate for the received misbehavior detection report, determining by the registration authority executing on the server computing device an onboard equipment identifier that identifies the V2X onboard equipment to the certificate provisioning backend, and sending by the registration authority executing on the server computing device the onboard equipment identifier and the received misbehavior detection report to the certificate provisioning backend.

In some aspects, routing the misbehavior detection report to the entity associated with the V2X onboard equipment may include receiving in a certificate provisioning backend executing on the server computing device a certificate provisioning backend request identifier (CPB Request ID) and the misbehavior detection report, determining by the certificate provisioning backend executing on the server computing device an onboard equipment identifier of the V2X onboard equipment based on the received CPB Request ID, and sending by the certificate provisioning backend executing on the server computing device the onboard equipment identifier and the received misbehavior detection report to a misbehavior report catcher of the entity.

Further aspects may include server computing devices having one or more processors configured with processor-executable instructions to perform various operations corresponding to any of the methods summarized above. In some aspects, the server may be configured or equipped with a pseudonym certificate authority, a registration authority, and/or a certificate provisioning backend configured to perform all or portions of the operations corresponding to any of the methods discussed above.

Further aspects may include a computing device having various means for performing functions corresponding to any of the methods summarized above. Further aspects may include a non-transitory processor-readable storage medium having stored thereon processor-executable instructions configured to cause a processor in a server computing device to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments include methods and mechanisms for routing misbehavior detection reports (MDRs) from vehicle-to-everything (V2X) or vehicle-to-vehicle (V2V) onboard equipment exhibiting misbehavior to an original equipment manufacturer (OEM) of the onboard equipment while accommodating various protections individual privacy and OEM proprietary information. A computing system, such as one or more servers coupled to a network (e.g., the Internet), may be configured to implement or provide misbehavior report router (MRR) functions and/or to store information (e.g., as part of a certificate issuing and provisioning processes, etc.) that allows subsequent routing of MDRs to the OEM (e.g., to a Misbehavior Report Catcher of the OEM) that produced the misbehaving onboard equipment while enabling the OEM to identity the misbehaving onboard equipment.

Vehicle-to-everything (V2X) systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

For ease of reference, some of the embodiments are described in this application using Basic Safety Message (BSM) and vehicle-to-vehicle (V2V) terminologies. However, it should be understood that various embodiments encompass any or all of the V2X or vehicle-based communication standards, messages or technologies. As such, nothing in the application should be construed to limit the claims to V2V and Basic Safety Message (BSM) unless expressly recited as such in the claims.

Figure 1:
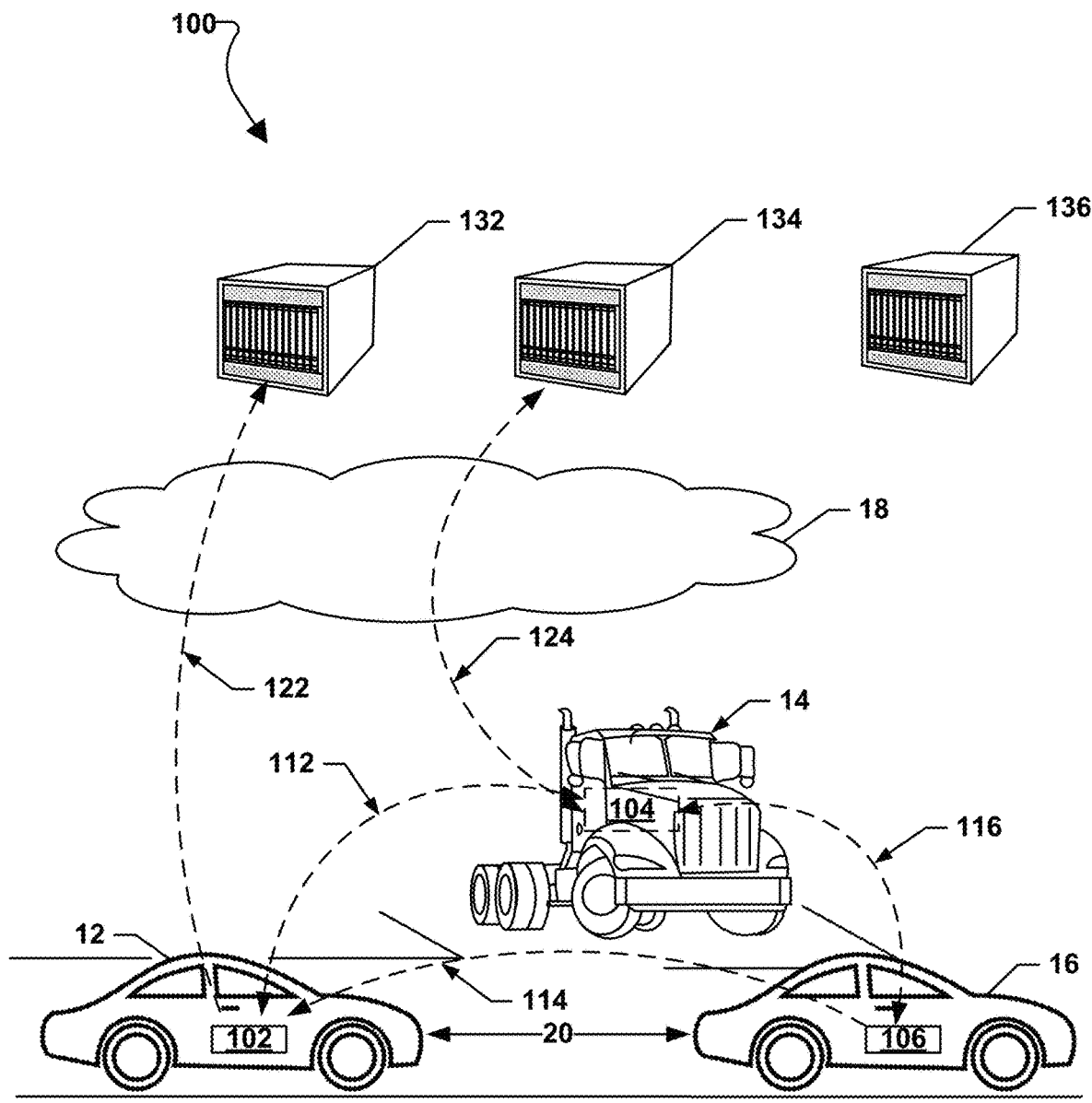
FIG. 1 is a schematic block diagram illustrating a subset of a V2V communication system suitable for implementing various embodiments.

To aid in describing the problem addressed by various embodiments, FIG. 1 illustrates a portion of the V2V system 100 including three vehicles, 12, 14, 16. Each vehicle 12, 14, 16 includes V2V onboard equipment 102, 104, 106, respectively, that are configured to periodically broadcast Basic Safety Messages 112, 114, 116 for receipt and processing by other vehicles' onboard equipment. By sharing the vehicle location, speed, direction, braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2V equipment 102 in the trailing vehicle 12 can apply brakes simultaneously to maintain the safe separation distance 20 even when the leading vehicle 16 stopped suddenly. As another example, the V2V equipment 104 within the truck vehicle 14 may receive Basic Safety Messages 112, 116 from the two vehicles 12, 16, and thus be informed that the truck vehicle 14 should stop at the intersection to avoid a collision.

Given the criticality of Basic Safety Messages to the safe operation of surrounding vehicles, care must be taken to ensure that Basic Safety Messages are accurate and can be relied upon by other vehicles. One measure used to ensure reliability involves issuing certificates to each V2V onboard equipment that can be used to sign Basic Safety Messages. The certificate issued to V2V onboard equipment does not include a persistent identity for the V2V onboard equipment, and for this reason is typically referred to as a Pseudonym Certificate. V2V onboard equipment in nearby vehicles and highway monitoring systems of a basic safety podcast can confirm the authenticity of the V2V onboard equipment issuing the Basic Safety Message by verifying the signature on the broadcast messages. V2V onboard equipment receiving a Basic Safety Message can verify the signature using a public key. To guard against hacking or interference with the V2V system operations, V2V onboard equipment may be configured to ignore any received Basic Safety Message that has been signed using an expired or invalid certificate.

While signing Basic Safety Messages using the certificate issued to V2V onboard equipment guards against attempts to inject false Basic Safety Messages, the signature verification process may not detect when inaccurate Basic Safety Messages are generated by malfunctioning V2V onboard equipment using a legitimate certificate. Various equipment malfunctions may cause a V2V onboard equipment to produce incorrect Basic Safety Messages. For example, faults in navigation sensors, speed sensors, and/or cabling from such sensors to the V2V onboard equipment may result in inaccurate reporting of vehicle position (e.g., in an incorrect lane or larger error) or speed. It is also possible that a V2V onboard equipment may be maliciously altered to produce incorrect Basic Safety Messages that are signed using a legitimate certificate. Both cases are referred to as misbehavior.

In many cases, a receiving V2V onboard equipment may detect the misbehavior via misbehavior detection in onboard processing. Incorrect Basic Safety Messages may be recognized by V2V onboard equipment in other vehicles when information contained in such messages conflicts with trustworthy information available to the V2V onboard equipment. For example, V2V onboard equipment may recognize that the position information in a received Basic Safety Message is incorrect when the reported location of the reporting vehicle overlaps with the position of the vehicle receiving the Basic Safety Message. As another example, V2V onboard equipment may recognize that the velocity information in received Basic Safety Message is incorrect when the velocity is inconsistent with the velocity of the equipment's own vehicle and surrounding vehicles. Other methods of recognizing incorrect Basic Safety Messages may be used.

To ensure the integrity and reliability of the V2V systems, V2V onboard equipment may be configured to inform other vehicles and highway systems or authorities of detected incorrect Basic Safety Messages by transmitting messages that notify other systems of the detected issues. In such cases, the receiving V2V onboard equipment may produce a misbehavior report or Misbehavior Detection Report (MDR in the figures). Each Misbehavior Detection Report may include the Pseudonym Certificate of the misbehaving V2V onboard equipment that signed the incorrect Basic Safety Message. The V2V onboard equipment that detected the misbehavior may be configured to send the Misbehavior Detection Report to a specific network backend entity for processing, which is referred to herein as the Misbehavior Report Catcher (MRC in the figures). The reporting V2V onboard equipment is typically configured by the OEM, so the Misbehavior Report Catcher is typically operated by, or on behalf of, the OEM of the reporting V2V onboard equipment.

Misbehavior detection reports may be collected by a misbehavior authority, which may be an entity run by any of a variety of parties, such as a government agency, an independent third-party agency or service provider, and/or an OEM. A misbehavior authority may be configured to take actions to protect the reliability and integrity of the V2V systems and equipment. For example, a misbehavior authority may blacklist the certificates of misbehaving V2V onboard equipment so that other V2V onboard equipment can know to ignore Basic Safety Messages containing blacklisted certificates. Decentralized misbehavior authorities may also inform certificate registration authorities of certificates so that appropriate actions can be taken by the corresponding Registration Authority.

The term misbehaving V2V onboard equipment is used herein for the V2V onboard equipment to which misbehavior is attributed to in a Misbehavior Detection Report. However, in some cases another component or entity, and not the attributed V2V onboard equipment, could be misbehaving using messages or credentials obtained from the V2V onboard equipment. For example, a faulty sensor or equipment in the same vehicle as the attributed V2V onboard equipment may be the cause of erroneous information in a Basic Safety Message resulting in a misbehavior detection, although there are other scenarios in which an entity outside the vehicle may be responsible for transmission of incorrect Basic Safety Messages.

An entity, such as an OEM, may use of Misbehavior Detection Reports for a variety of reasons. For example, an OEM of an V2V onboard equipment may be interested in seeing information regarding the Misbehavior Detection Report for misbehavior attributed to that V2V onboard equipment. In some cases, the OEM may want the information purely for recording statistics. In other cases, the OEM may take appropriate steps including, but not limited to, any of the following: attempting to fix errors in the V2V onboard equipment implementation; replacing the V2V onboard equipment; disabling the V2V onboard equipment; notifying the owner that the vehicle should be brought in for maintenance; deleting certificates from the V2V onboard equipment; placing some of the V2V onboard equipment certificates on a revocation list; issuing new certificates to the V2V onboard equipment. The OEM may perform such steps over the air in some cases, while physical access to the V2V onboard equipment is required in other cases.

In many cases, the OEM of the misbehaving V2V onboard equipment is not the OEM of the reporting V2V onboard equipment. OEMs may choose to share information regarding Misbehavior Detection Reports. In such cases, the OEM of the misbehaving V2V onboard equipment may not have access to the reporting V2V onboard equipment Misbehavior Report Catcher. This may happen when the Misbehavior Report Catcher is operated by, or on behalf of, the OEM of the reporting V2V onboard equipment. Consequently, there is a need to allow the delivery of Misbehavior Detections Reports from the Misbehavior Report Catcher of the OEM of the reporting V2V onboard equipment to the Misbehavior Report Catcher of the OEM of the misbehaving V2V onboard equipment. When OEMs share information, it is important that the shared Misbehavior Detection Report information does not include information considered private to the owner of the misbehaving V2V onboard equipment. In addition to protecting individual privacy, the reporting V2V onboard equipment OEM might not wish to share other information regarding the Misbehavior Detection Report due to business confidentiality reasons. It is the responsibility of the reporting V2V onboard equipment OEM to produce shared Misbehavior Detection Report information meeting the owner's privacy criteria and the OEMs confidentiality criteria.

There are various obstacles to routing information regarding misbehaving V2V equipment to an entity that can make use of the information. One obstacle is the lack of a mechanism for delivering appropriate information from Misbehavior Detection Reports to particular entities (e.g., an OEM of the misbehaving equipment). The privacy protections implemented in V2V certificate systems, introduced to obscure the identity of the individual onboard equipment, result in additional obstacles. If the misbehaving V2V onboard equipment's Pseudonym Certificate Authority issues Pseudonym Certificates for multiple OEMs' V2V onboard equipment, then the Misbehavior Report Catcher might be unable to independently identify the misbehaving V2V onboard equipment's OEM from the Pseudonym Certificate. This means that, in many cases, delivering a Misbehavior Detection Report is not simply a matter of sending the Misbehavior Detection Report directly from the Misbehavior Report Catcher to the OEM of the misbehaving V2V onboard equipment. A further obstacle is that the privacy protection can, in some cases, prevent the misbehaving V2V onboard equipment OEM from independently identifying the misbehaving V2V onboard equipment from the Pseudonym Certificate.

These obstacles to entities sharing Misbehavior Detection Reports that is addressed by the various embodiments is illustrated for a portion of a V2V system 100 in FIG. 1. In the illustrated example, V2V onboard equipment 106 of the lead vehicle 16 has issued incorrect Basic Safety Messages that have been recognized by the V2V onboard equipment 102 of the trailing vehicle 12, which has transmitted a Misbehavior Detection Report 122, via a communication network 18, to a Misbehavior Report Catcher 132 operated by the OEM of the vehicle 12. Similarly, V2V onboard equipment 104 of the truck vehicle 14 has also recognized the errors and has transmitted a Misbehavior Detection Report 124, via the communication network 18, to a Misbehavior Report Catcher 134 operated by the OEM of the truck vehicle 14. However, due to the privacy protections implemented within the certificate process, Basic Safety Messages, and Misbehavior Detection Reports, the Misbehavior Detection Reports do not reach the Misbehavior Report Catcher 136 operated by the entity taking responsibility for the onboard equipment 106 (e.g., the OEM of the lead vehicle 16 or potentially the OEM of the misbehaving V2V onboard equipment 106).

Various embodiments provide methods and mechanisms for routing Misbehavior Detection Reports to a responsible or interested entity, such as the OEM of the V2V onboard equipment that exhibited the misbehavior. The various embodiments allow the Misbehavior Report Catcher of the entity (e.g., the OEM of the misbehaving V2V onboard equipment) to receive Misbehavior Detection Reports despite the protections implemented within the certificate provisioning system to protect individual privacy and entity proprietary information, thereby enabling corrective actions to be taken. Various embodiments are described referring to the equipment or vehicle OEMs as the entity to which Misbehavior Detection Reports. However, the equipment or vehicle OEMs are merely convenient examples of entities to which the reports may be routed. Therefore, references to the OEM in the following embodiment descriptions are not intended to limit the scope of the claims to particular entities unless expressly recited in claim language.

Various embodiments leverage the authorities, networks and infrastructure used for provisioning certificates to V2V onboard equipment, thus reducing the need for additional systems or complexity. In overview, various embodiments introduce a Misbehavior Report Router (MRR in the figures) function within one or more authorities, and add a step of storing information in such routers to allow subsequent routing of Misbehavior Detection Reports to the proper entity (e.g., the responsible OEM). The information stored in one or more Misbehavior Report Routers during or resulting from certificate issuing and provisioning processes may include the certification issued to an onboard equipment, the identity of the Registration Authority or OEM requesting the certificate (when the Registration Authority is not owned by the OEM), and a Certificate Signing Request (CSR in the figures) identifier (OEM CSR ID in the figures) that initiated generation of the certificate to the V2V onboard equipment. By storing this information in Misbehavior Report Routers, a Misbehavior Detection Report received from a reporting V2V onboard equipment can be routed back to the OEM (e.g., to a Misbehavior Report Catcher of the OEM) that produced the misbehaving V2V onboard equipment in a manner that allows the identity of the misbehaving V2V onboard equipment to be determined by its OEM.

To facilitate description of the various embodiments, the following background on the IEEE 1609.2 certificate issuing and provisioning system is provided. The following description is high level and provided primarily to explain the roles of various authorities and functionalities envisioned for issuing certificates to V2V onboard equipment. Various embodiments are not limited to the following certificate issuing processes.

IEEE 1609.2 is the standard that defines the security mechanisms for IEEE 1609 V2V systems, components and onboard equipment. The sending V2V onboard equipment attaches a public key signature to each Basic Safety Message, which can be verified by the public signing key in a Pseudonym Certificate which has been issued to the sending V2V onboard equipment. The public key signature applied by V2V onboard equipment using the provisioned Pseudonym Certificate attests that that V2V onboard equipment is trusted to provide correct Basic Safety Messages. The receiving V2V onboard equipment validates the Pseudonym Certificate, and then verifies the public key signature attached to the Basic Safety Message using the public signing key in the certificate; other validity tests may be employed as well (e.g., feasibility assessment, comparison with own sensors, etc.). If these tests are all successful, then the Basic Safety Message is considered to be trustworthy.

If an V2V onboard equipment uses a single certificate, then the V2V onboard equipment (and its vehicle) might be tracked by recording the locations where this single certificate is used. Likewise, if the V2V onboard equipment uses multiple certificates that can be easily linked to each other, then the V2V onboard equipment (and its vehicle) might be tracked by recording the locations where the set of certificates are used.

For this reason, a Pseudonym Certificate Authority (PCA) issues each V2V onboard equipment with multiple Pseudonym Certificates which cannot be linked to each other without help from the Pseudonym Certificate Authority and other entities that were involved in issuing the Pseudonym Certificate. The Secure Credential Management System (SCMS) is an example of a system for generating and provisioning Pseudonym Certificates with these properties. In many cases, an OEM, such as the vehicle manufacturer or the manufacturer of the V2V onboard equipment purchased by the vehicle OEM, is part of the system involved in issuing the Pseudonym Certificate, and thus may control one or more of the Pseudonym Certificate Authority, Intermediate Certificate Authority (ICA in the figures), and Registration Authority, or other components of the Certificate Provisioning Backend.

The system for issuing the Pseudonym Certificates to the V2V onboard equipment is modelled as having four logical components: Pseudonym Certificate Authority, Registration Authority (RA in the figures), Certificate Provisioning Backend (CPB in the figures) and V2V onboard equipment. The term "Certificate Provisioning Backend" is used to refer to various additional systems and components that may be implemented by an OEM or other entity for performing or enabling the provisioning (or requesting provisioning via third-parties) of certificates to V2V onboard equipment beyond those of the Pseudonym Certificate Authority and Registration Authority. The V2V onboard equipment and Pseudonym Certificate Authority (PCA in the figures) have already been mentioned. The Registration Authority (RA in the figures) manages the V2V onboard equipment's interactions with the Pseudonym Certificate Authority. The Certificate Provisioning Backend manages provisioning of the certificate into the V2V onboard equipment.

Figure 2:
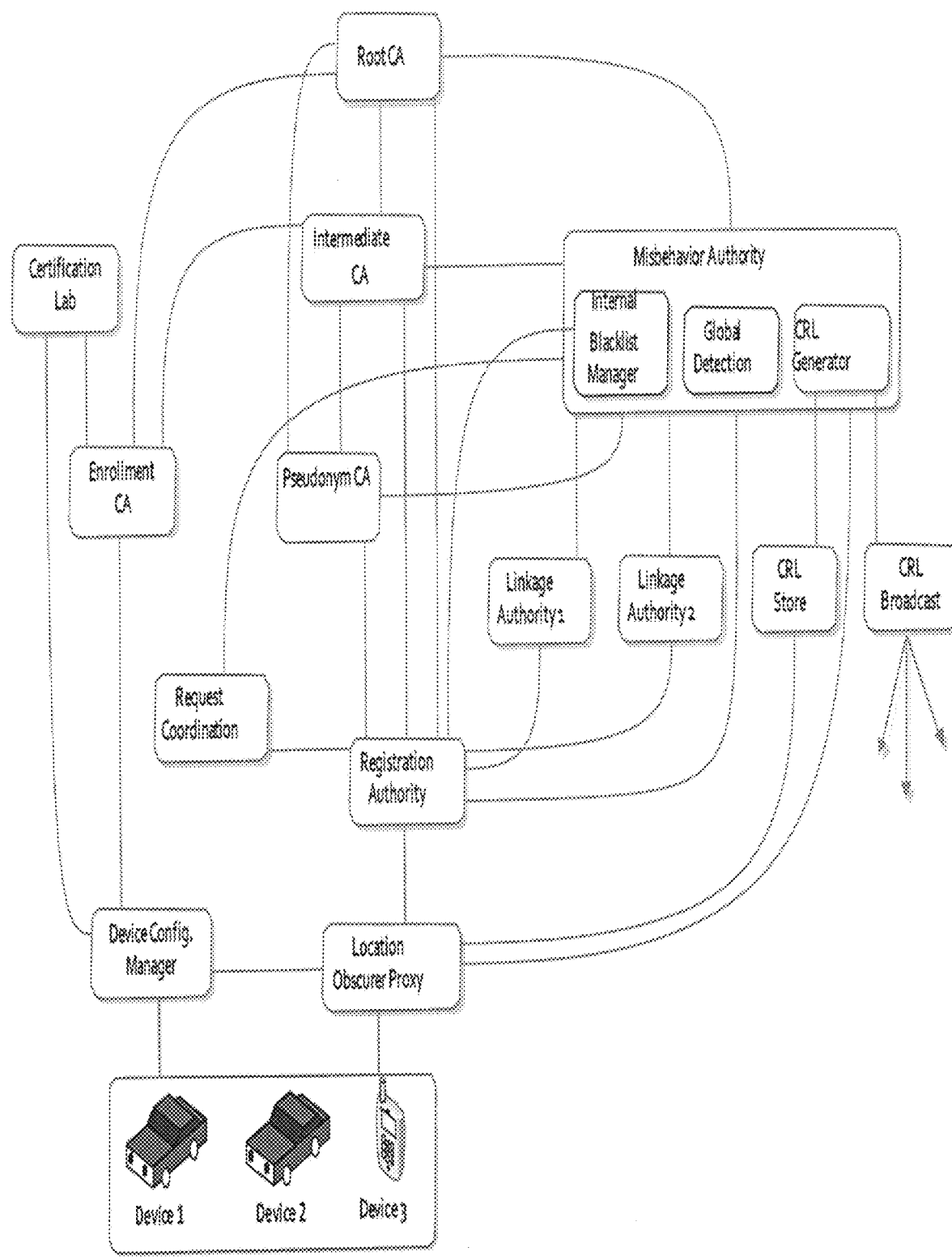
FIG. 2 is a diagram of an example certificate provisioning network or provisioning certificates to V2V onboard equipment.

FIG. 2 diagrams various entities and relations between entities involved in requesting and issuing Pseudonym Certificates to individual V2V onboard equipment, as well as relationships between various organizations involved in the process including the OEMs that manufacture the V2V onboard equipment.

Figure 3A:
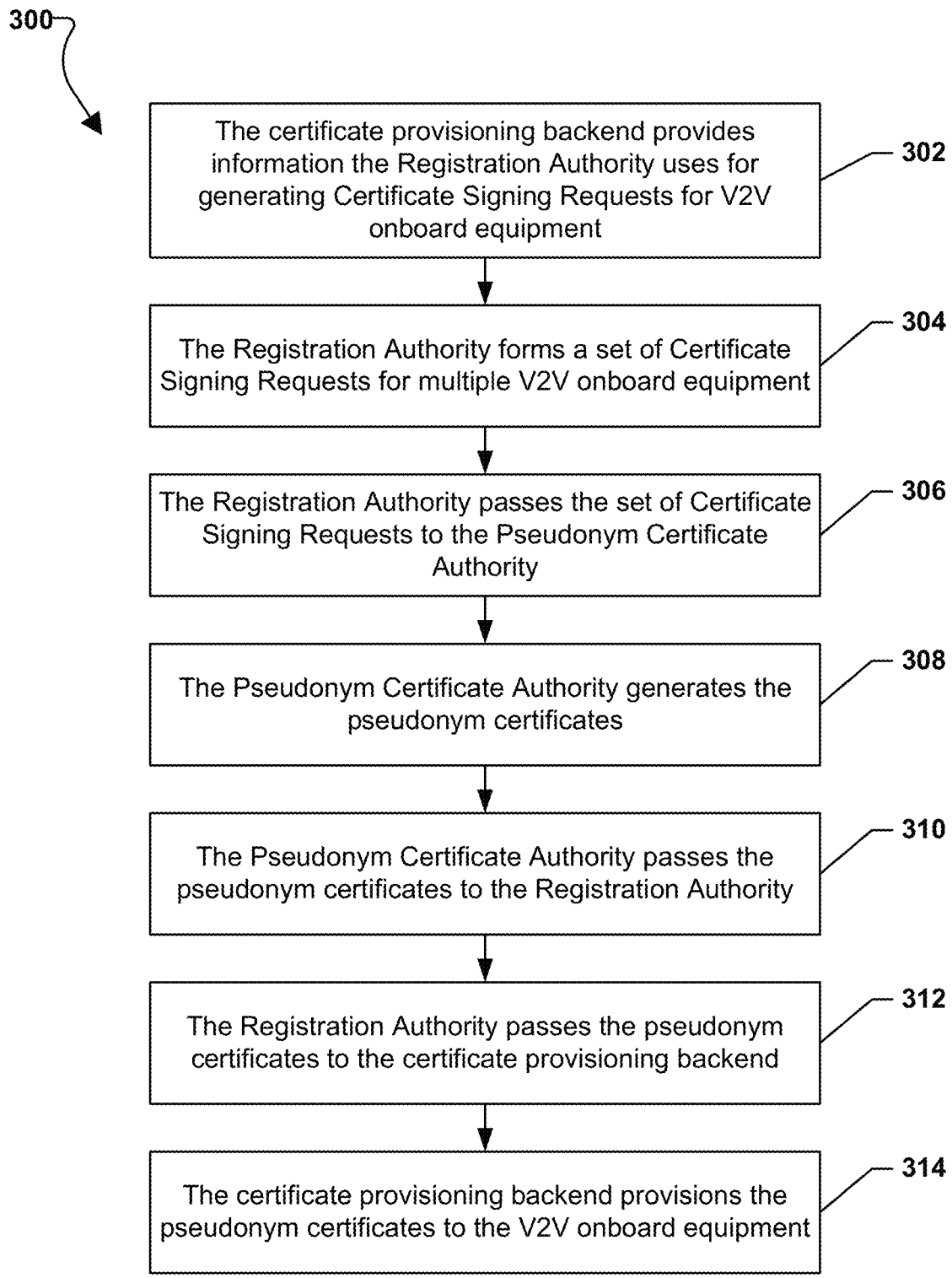
FIGS. 3A-3E are process flow diagrams of example methods of provisioning certificates to V2V onboard equipment.

A simplified process flow 300 of basic operations involved in issuing and provisioning a Pseudonym Certificate to an individual V2V onboard equipment is illustrated in FIG. 3A.

In block 302, the Certificate Provisioning Backend requests that the Registration Authority obtain a set of Pseudonym Certificates from the Pseudonym Certificate Authority, including information that the Registration Authority will use for generating individual Certificate Signing Requests (CSR in the figures) for V2V onboard equipment. In many cases, the Certificate Provisioning Backend may be controlled by the OEM of the V2V onboard equipment or an OEM that is purchasing such equipment to be installed in a particular vehicle. In some cases, the Certificate Provisioning Backend may be an independent entity or controlled by another company providing services to the OEM.

In block 304, the Registration Authority foil is a set of Certificate Signing Requests for multiple V2V onboard equipment, based on the requests from one or more Certificate Provisioning Backends.

In block 306, the Registration Authority passes the set of Certificate Signing Requests to the Pseudonym Certificate Authority.

In block 308, the Pseudonym Certificate Authority generates the Pseudonym Certificates.

In block 310, the Pseudonym Certificate Authority passes the Pseudonym Certificates to the Registration Authority.

In block 312, the Registration Authority passes the set of Pseudonym Certificates for V2V onboard equipment to the Certificate Provisioning Backend.

In block 314, the Certificate Provisioning Backend provisions the set of Pseudonym Certificates to the V2V onboard equipment.

Figure 3B:
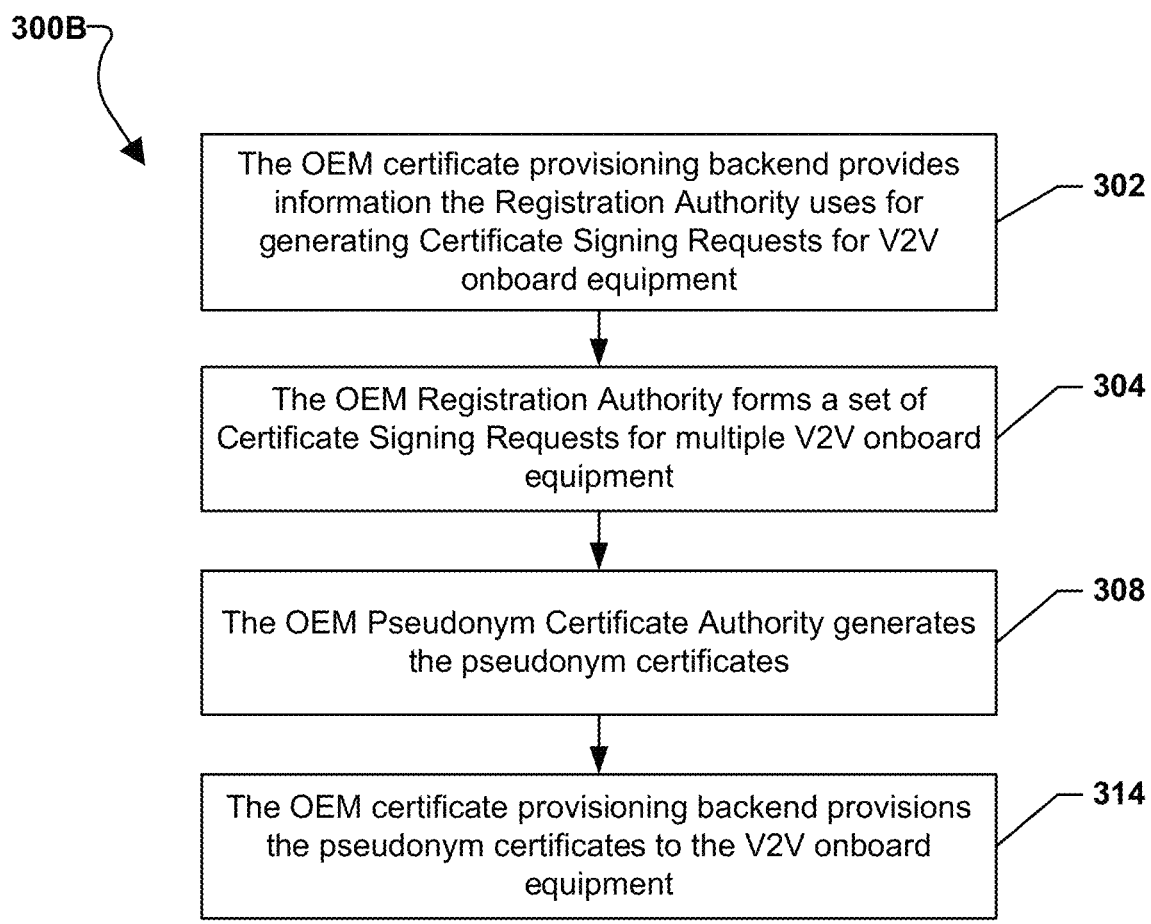
Figure 3C:
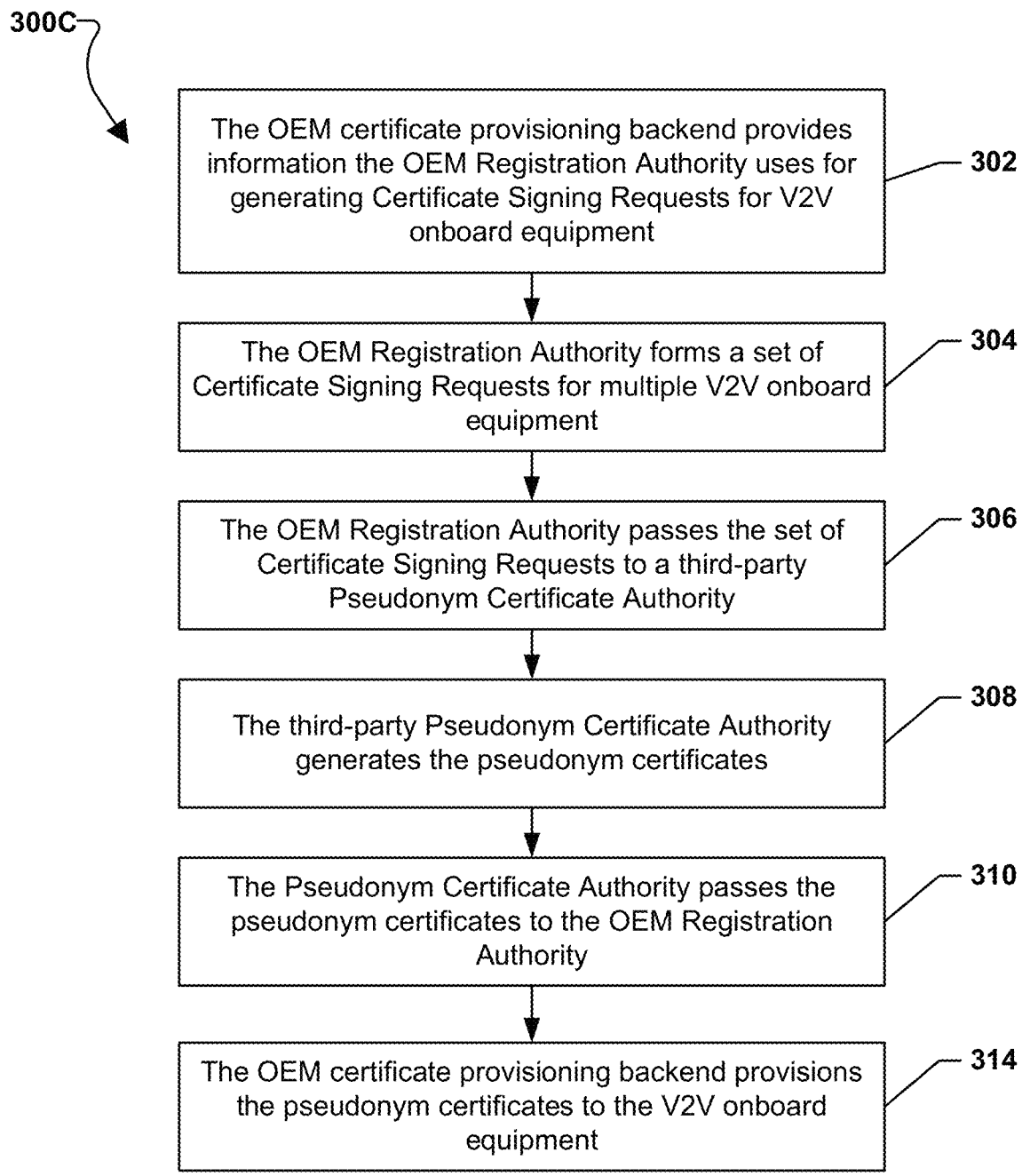
Figure 3D:
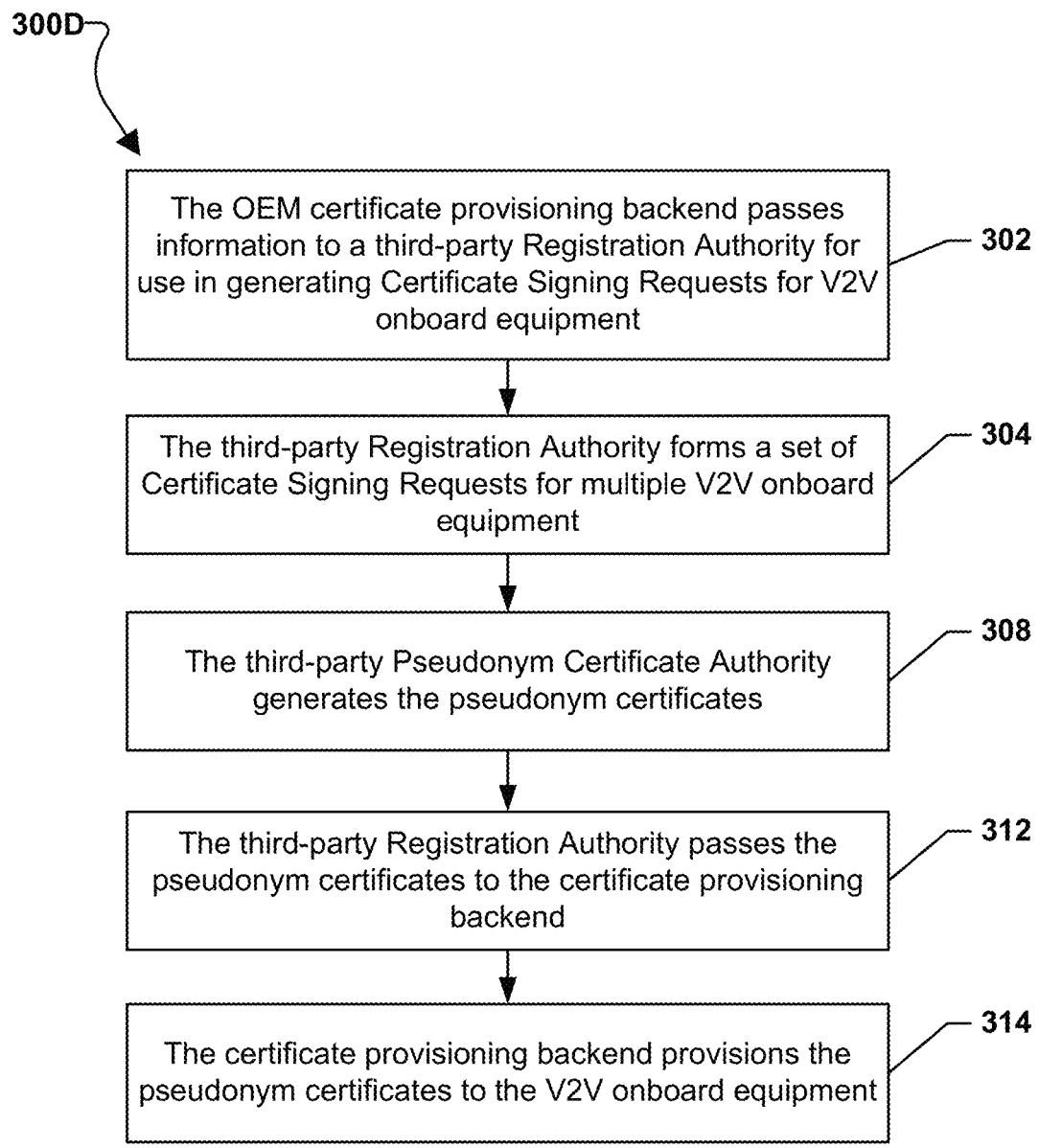
Figure 3E:
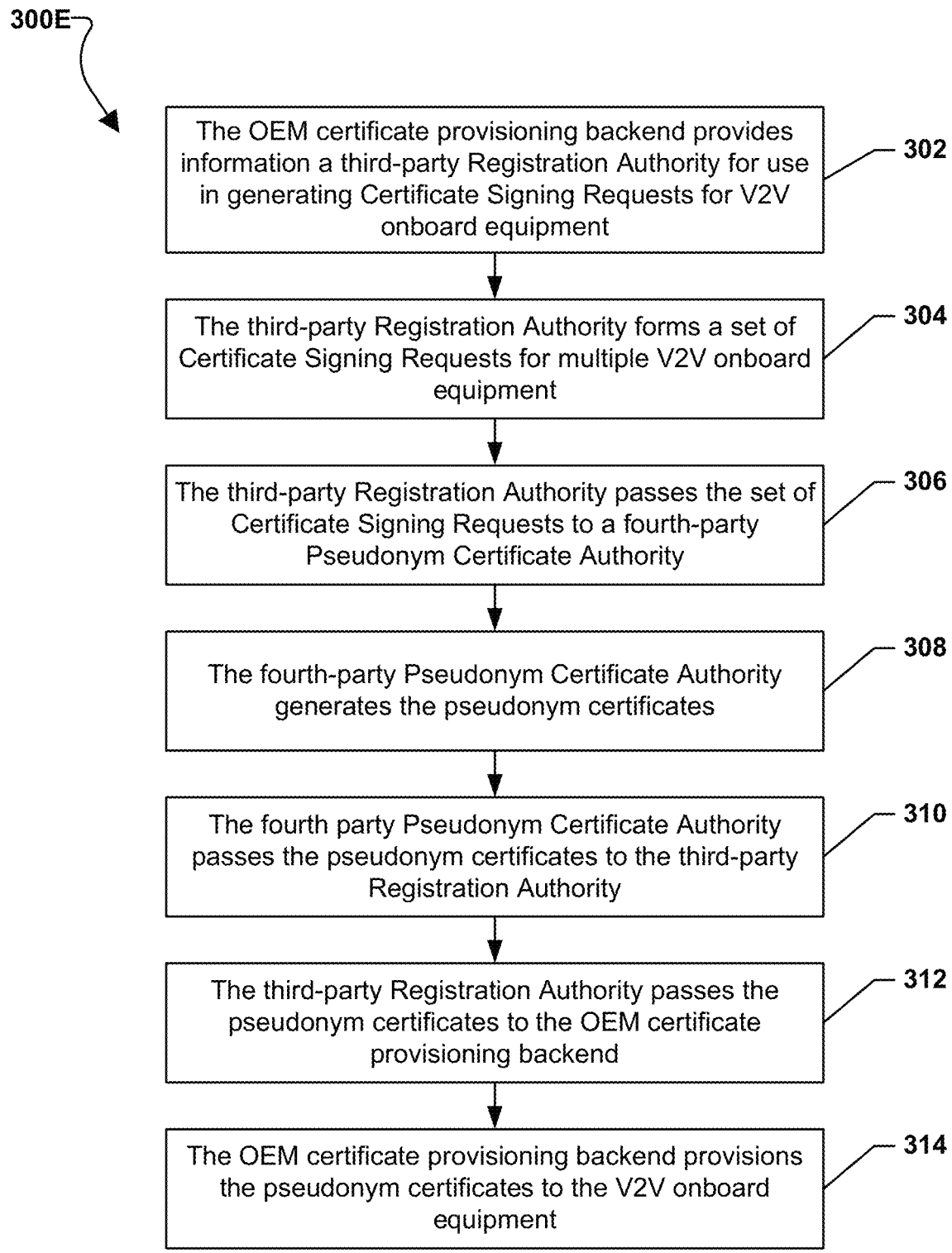

Some details are ignored in the process flow illustrated in FIG. 3A that depend on which parties provides the Pseudonym Certificate Authority and Registration Authority. In a first option illustrated in FIG. 3B as method 300B, the OEM provides the Certificate Provisioning Backend, Registration Authority and Pseudonym Certificate Authority. In a second option illustrated in FIG. 3C as method 300C, the OEM provides the Certificate Provisioning Backend and the Registration Authority, and a third party provides the Pseudonym Certificate Authority. In a third option illustrated in FIG. 3D as method 300D, the OEM provides the Certificate Provisioning Backend, and a third party provides the Registration Authority and Pseudonym Certificate Authority. In a fourth option illustrated in FIG. 3E as method 300E, the OEM provides the Certificate Provisioning Backend, a third party provides the Registration Authority, and a fourth party provides the Pseudonym Certificate Authority. These four options for ownership of the authorities and Certificate Provisioning Backend are addressed in various embodiments as described herein.

A goal of Secure Credential Management System is preventing any individual entity from linking multiple Pseudonym Certificates issued to a single V2V onboard equipment, with the assumption that each entity is provided by a separate party. The Certificate Provisioning Backend is not in scope of Secure Credential Management System, so the details of the Secure Credential Management System focus on mechanisms for preventing the Registration Authority and Pseudonym Certificate Authority from independently linking multiple Pseudonym Certificates to a single V2V onboard equipment.

In the first and third options, the Pseudonym Certificate Authority and Registration Authority are provided by a single party, which differs from the assumption in the previous paragraph. That party can link multiple Pseudonym Certificates issued to a single V2V onboard equipment.

In the first option the OEM can link multiple Pseudonym Certificates to a single V2V onboard equipment, and the OEM can identify the V2V onboard equipment.

In the third option, the third party can link multiple Pseudonym Certificates to a single V2V onboard equipment, but the Certificate Provisioning Backend can hide the identity of that V2V onboard equipment from the third Party. The third party can prevent the OEM from independently linking multiple Pseudonym Certificates to a single V2V onboard equipment—to achieve this the Pseudonym Certificate Authority or Registration Authority encrypts the issued Pseudonym Certificates (optionally in batches) before passing the encrypted Pseudonym Certificates to the OEM for certificate provisioning, with the V2V onboard equipment applying decryption before installing the Pseudonym Certificates. When these mechanisms are applied, the Certificate Provisioning Backend must have a mechanism to correlate the encrypted Pseudonym Certificates with the correct V2V onboard equipment, to ensure the certificates are delivered correctly.

In the second and fourth options, the Pseudonym Certificate Authority and Registration Authority are provided by separate parties, and thus the Secure Credential Management System mechanisms can prevent those parties from independently linking multiple Pseudonym Certificates issued to a single V2V onboard equipment. These mechanisms include the Pseudonym Certificate Authority encrypting each issued Pseudonym Certificate individually. When these mechanisms are applied, the Registration Authority must be able to correlate a Certificate Signing Requests to its corresponding encrypted Pseudonym Certificate, to ensure the certificates are routed to the correct Certificate Provisioning Backend, and to ensure that the Certificate Provisioning Backend delivers the encrypted Pseudonym Certificate to the correct Registration Authority.

In the second option, the OEM provides the Certificate Provisioning Backend and Registration Authority, so there is no need for the Certificate Provisioning Backend to hide the identity of the V2V onboard equipment from the Registration Authority.

In the fourth option, the third party can link multiple Pseudonym Certificates to a single V2V onboard equipment, but the Certificate Provisioning Backend can hide the identity of that V2V onboard equipment from the third party. There is no need for the Registration Authority to apply additional encryption to the certificates, since they are already encrypted. However, the Certificate Provisioning Backend needs a mechanism to correlate the encrypted Pseudonym Certificates with the correct V2V onboard equipment to ensure the certificates are delivered correctly.

In situations in which the Certificate Provisioning Backend and Registration Authority are provided by separated parties, the Certificate Provisioning Backend includes a mechanism to correlate the encrypted Pseudonym Certificates with the corresponding V2V onboard equipment. Similarly, situations in which the Registration Authority and Pseudonym Certificate Authority are provided by separated parties, the Registration Authority includes a mechanism to correlate an encrypted Pseudonym Certificate with the corresponding Certificate Signing Requests.

In various embodiments, the shared Misbehavior Detection Report information may include the Pseudonym Certificate used to sign the incorrect Basic Safety Message, or else include information uniquely identifying that Pseudonym Certificate. Such information may include the identity of the Pseudonym Certificate Authority and additional information that uniquely identifies the certificate from among those issued by the Pseudonym Certificate Authority.

Various embodiments include entities for routing shared Misbehavior Detection Report information from the Misbehavior Report Catcher of the reporting V2V onboard equipment OEM to the Misbehavior Report Catcher of the misbehaving V2V onboard equipment OEM in a way that allows identification of the misbehaving V2V onboard equipment by its OEM. For the purposes of this description, this routing entity is called a Misbehavior Report Router (MRR in the figures). The routing of Misbehavior Detection Reports can be partitioned into routing to a Misbehavior Report Router associated with the misbehaving V2V onboard equipment Pseudonym Certificate Authority, and then routing from this Misbehavior Report Router to the OEM.

The Pseudonym Certificate Authority provider shares the identity of its Misbehavior Report Router with those entities from which the Pseudonym Certificate Authority's Misbehavior Report Router is willing to accept shared Misbehavior Detection Report information. Any such entity can examine the identity of the Pseudonym Certificate Authority included in the shared Misbehavior Detection Report information, determine the associated Misbehavior Report Router, and send the shared Misbehavior Detection Report information to this Misbehavior Report Router.

After the shared Misbehavior Detection Report information is routed to the misbehaving V2V onboard equipment Pseudonym Certificate Authority's Misbehavior Report Router, the shared Misbehavior Detection Report information is routed towards the Misbehavior Report Catcher of the misbehaving V2V onboard equipment's OEM. It makes sense to route the shared Misbehavior Detection Report information along the same path as the delivery of the Pseudonym Certificate when it was issued. For this routing, a Misbehavior Report Router could be associated with each entity involved in the issuing and provisioning of Pseudonym Certificates, namely with the Pseudonym Certificate Authority, the Registration Authority and the Certificate Provisioning Backend.

To allow routing of Misbehavior Detection Reports received from other OEMs, the various Misbehavior Report Routers store information that was available during the process of requesting and provisioning certifications to V2V equipment during or following manufacture.

A Pseudonym Certificate Authority's Misbehavior Report Router stores information about each issued Pseudonym Certificate that may include an identity of the corresponding Registration Authority, and information which that Registration Authority can use to identify the corresponding Certificate Signing Request that resulted in issuing that Pseudonym Certificate. An example of information a Registration Authority can use to identify the corresponding Certificate Signing Request is a Registration-Authority-assigned Certificate Signing Request Identifier (CSR ID in the figures), which the Registration Authority provides with a Certificate Signing Request and which the Pseudonym Certificate Authority returns with the optionally encrypted Pseudonym Certificate. The remaining description of various embodiments is based on the example case that the information is in the form of a Certificate Signing Request Identifier, but it should be understood that other information could be used in the place of a Certificate Signing Request Identifier.

A Registration Authority's Misbehavior Report Router stores information about each Certificate Signing Request and corresponding Pseudonym Certificate, including a) information identifying the corresponding Certificate Provisioning Backend, and b) information the Certificate Provisioning Backend can use to identify the request for a set of Pseudonym Certificates for a V2V onboard equipment. Note that, if the Pseudonym Certificate Authority encrypted the Pseudonym Certificate Authority, then the Registration Authority cannot identify the corresponding Pseudonym Certificate without assistance from the Pseudonym Certificate Authority. An example of information that the Certificate Provisioning Backend can use to identify the request for a set of Pseudonym Certificates for a V2V onboard equipment is a Certificate-Provisioning-Backend-assigned Certificate Provisioning Backend Request Identifier, which the Certificate Provisioning Backend provides with the request and which the Registration Authority returns with the set of optionally encrypted Pseudonym Certificates. The remaining description of various embodiments is based on the example case that the information is in the form of a Certificate Provisioning Backend Request Identifier, but it should be understood that other information could be used in the place of a Certificate Provisioning Backend Request Identifier.

For each request sent to the Registration Authority for a set of Pseudonym Certificates for a V2V onboard equipment, the Certificate Provisioning Backend Misbehavior Report Router stores the Certificate Provisioning Backend Request Identifier and the identity of the corresponding V2V onboard equipment. The party providing the entity (Pseudonym Certificate Authority, Registration Authority or Certificate Provisioning Backend) would typically also provide the corresponding Misbehavior Report Router, although this functionality could be delegated to another party.

The Misbehavior Report Router may be integrated into the corresponding entity (i.e., Pseudonym Certificate Authority, Registration Authority, and/or Certificate Provisioning Backend), such as additional functionality implemented within a server.

Figure 4:
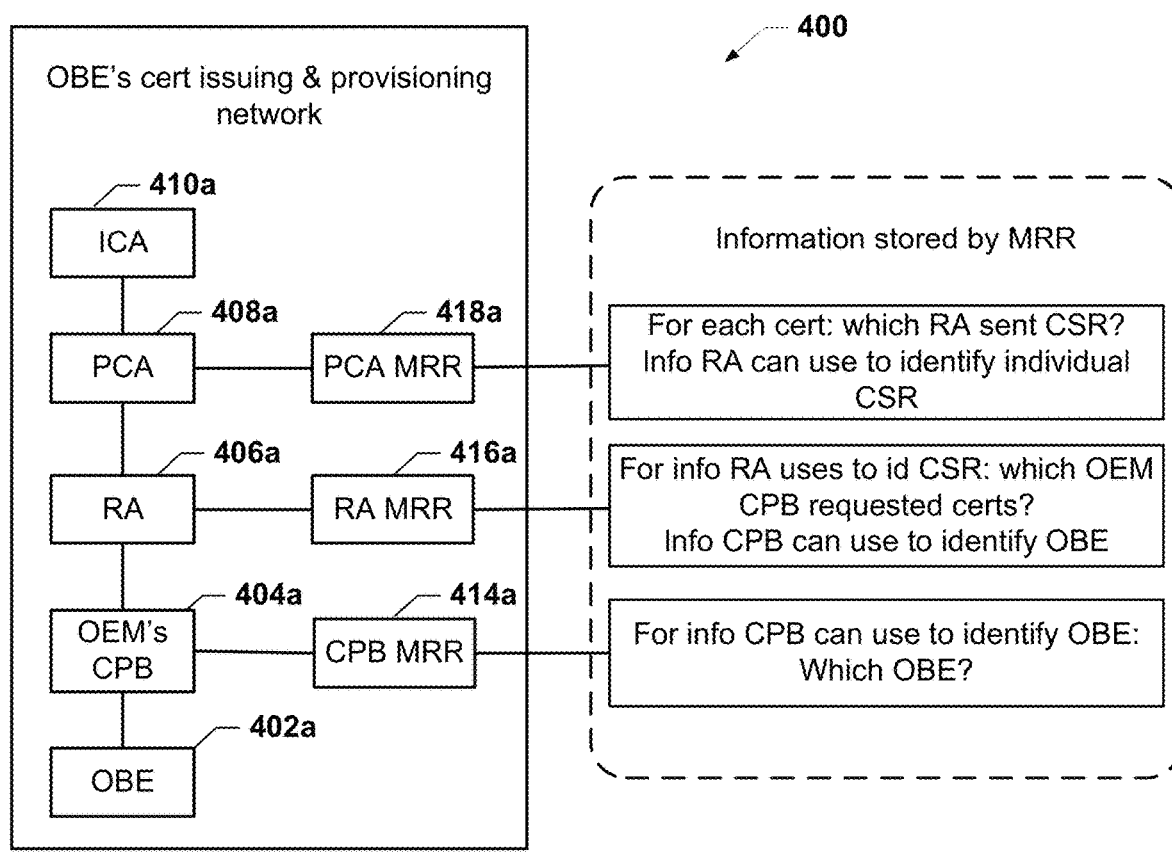
FIG. 4 is a diagram of an OEM certificate issuing and provisioning network and associated Misbehavior Report Routers identifying information that may be stored in each during the certificate provisioning process according to various embodiments.

FIG. 4 illustrates various Misbehavior Report Routers linked to corresponding entities within the certification issuing and provisioning network 400. In the example illustrated in FIG. 4, the provisioning network 400 includes a V2V onboard equipment (OBE) 402, a Certificate Provisioning Backend (CPB) 404, a Registration Authority (RA) 406, a Pseudonym Certificate Authority (PCA) 408, an Intermediate Certificate Authority (ICA) 410, a Certificate Provisioning Backend Misbehavior Report Router (CPB MRR) 414, a Registration Authority Misbehavior Report Router (RA MRR) 416, and Pseudonym Certificate Authority Misbehavior Report Router (PCA MRR) 418.

A V2V onboard equipment 402a to be provisioned may be connected to the OEM's Certificate Provisioning Backend 404a (OEM'S CPB in the figure) for receiving the certificate. The OEM's Certificate Provisioning Backend 404a may be connected to a Registration Authority 406a for purposes of receiving certificates. The Registration Authority 406a may receive certificates from a Pseudonym Certificate Authority 408a, which may receive certificates from an Intermediate Certificate Authority 410a. To facilitate routing of Misbehavior Detection Reports, the Pseudonym Certificate Authority 408a may be associated with a Pseudonym Certificate Authority Misbehavior Report Router 418a, the Registration Authority 406a may be associated with a Registration Authority Misbehavior Report Router 416a, and the OEM's Certificate Provisioning Backend 404a may be associated with a Certificate Provisioning Backend Misbehavior Report Router 414a.

During the requesting and provisioning of certificates to individual V2V onboard equipment, the Pseudonym Certificate Authority Misbehavior Report Router 418a may store for each certificate information identifying the Registration Authority Misbehavior Report Router 416a associated with the Registration Authority 406a that sent the Certificate Signing Request (CSR in the figure), and the corresponding CSR ID, as described above.

Also during the requesting and provisioning of certificates to individual V2V onboard equipment, the Registration Authority Misbehavior Report Router 416a may store information that the Registration Authority 406a uses to identify the Certificate Provisioning Backend Misbehavior Report Router 414a associated with the CPB 404a that requested individual certificates, and the corresponding CPB Request ID, as described above.

Also during the requesting and provisioning of certificates to individual V2V onboard equipment, the Certificate Provisioning Backend Misbehavior Report Router 414a may store information during the certificate provisioning process that the CPB 404a can use to identify the particular onboard equipment associated with the particular CPB Request ID.

Note that FIG. 4 illustrates the most general case without consideration of whether a single party, such as a large OEM, provides more than one of the Certificate Provisioning Backend, Registration Authority and Pseudonym Certificate Authority. This corresponds to Option 4 described above. If a single party provides more than one of these entities, as in the first three options described above, then that single party can choose to implement the MRRs separately or merge some or all the individual MRRs, without impacting the remainder of the architecture. Further, the OEM may choose to merge the Certificate Provisioning Backend Misbehavior Report Router 414a with the Misbehavior Report Catcher, noting that the Misbehavior Report Catcher is not shown in FIG. 4.

Figure 5:
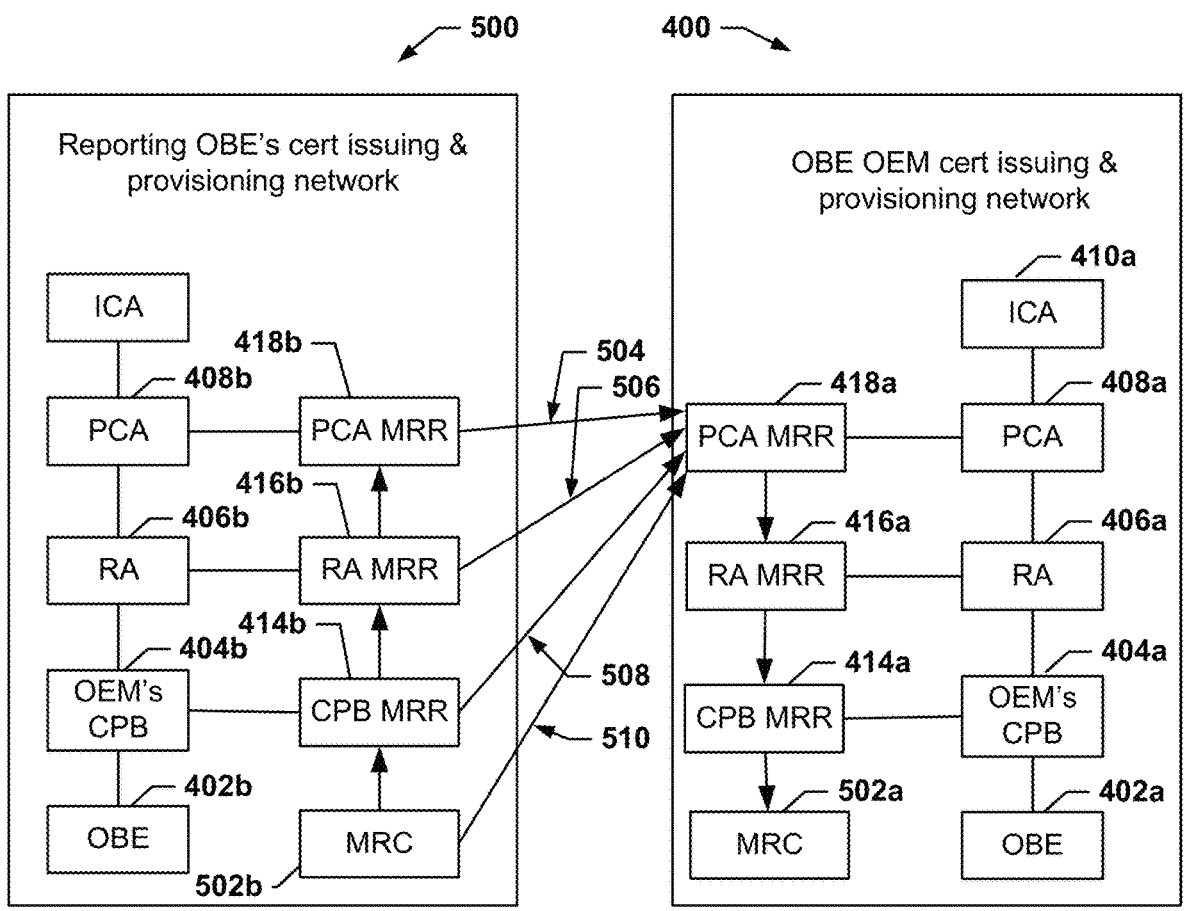
FIG. 5 is a diagram of two OEM certificate issuing and provisioning networks illustrating alternative routings of Misbehavior Detection Reports according to some embodiments.

FIG. 5 illustrates how individual Misbehavior Detection Reports, provided to a Misbehavior Report Catcher 502b ("MRC" in the figure) of a reporting V2V onboard equipment 402b ("OBE" in the figure) detecting a misbehaving V2V onboard equipment 402a, may be routed from the Misbehavior Report Catcher 502b associated with the reporting onboard equipment to the Misbehavior Report Catcher 502a associated with the misbehaving V2V onboard equipment 402a. As with FIG. 4, FIG. 5 illustrates the most general case without consideration of whether a single party, such as a large OEM, provides more than one of the Certificate Provisioning Backend, Registration Authority and Pseudonym Certificate Authority. The previous paragraph addresses implementation choices available to a single party which provides more than one of these entities.

As described above, misbehaving report routers 414b, 416b, 418b may be associated with the Certificate Provisioning Backend 404b, Registration Authority 406b, and/or Pseudonym Certificate Authority 408b of the provisioning network 500. Any of these misbehaving report routers 414b, 416b, 418b may determine the appropriate Pseudonym Certificate Authority Misbehavior Report Router 418a from information within the Misbehavior Detection Report. Depending upon network permissions and authorizations, any of these misbehaving report routers 414b, 416b, 418b may route the Misbehavior Detection Report to the appropriate Pseudonym Certificate Authority Misbehavior Report Router 418a along respective communication path 504, 506, 508. Additionally or exclusively, the Misbehavior Report Catcher 502a of that certificate provisioning network 500 may route the Misbehavior Detection Report to the appropriate Pseudonym Certificate Authority Misbehavior Report Router 418a along a separate communication path 510.

The authorities, routers and entities of the onboard equipment's OEM network are described above with reference to FIG. 4 for like reference numbers.

The Pseudonym Certificate Authority Misbehavior Report Router 418a examines the Misbehavior Detection Report to uniquely identify the Pseudonym Certificate that was used to sign the Basic Safety Message. The Pseudonym Certificate Authority Misbehavior Report Router 418a determines the identity of the Registration Authority Misbehavior Report Router 416a associated with the Registration Authority 406a that requested the Pseudonym Certificate; and the corresponding Certificate Signing Request Identifier. The Pseudonym Certificate Authority Misbehavior Report Router 418a sends the Misbehavior Detection Report to the identified Registration Authority Misbehavior Report Router 416a with the corresponding Certificate Signing Request Identifier.

The Registration Authority Misbehavior Report Router 416a examines the Certificate Signing Request Identifier and determines the identity of the Certificate Provisioning Backend Misbehavior Report Router 414a associated with the OEM's Certificate Provisioning Backend 404a that requested the set of Pseudonym Certificates; and Certificate Provisioning Backend Request Identifier. The Registration Authority Misbehavior Report Router 416a sends the Misbehavior Detection Report to the identified OEM Certificate Provisioning Backend Misbehavior Report Router 414a with the Certificate Provisioning Backend Request Identifier.

The Certificate Provisioning Backend Misbehavior Report Router 416a examines the Certificate Provisioning Backend Request Identifier and determines the corresponding V2V onboard equipment 402a for which the Pseudonym Certificates were requested. The Certificate Provisioning Backend Misbehavior Report Router sends the Misbehavior Detection Report to the Misbehavior Report Catcher 502a, along with the identity of the corresponding misbehaving V2V onboard equipment 402a.

Figure 6:
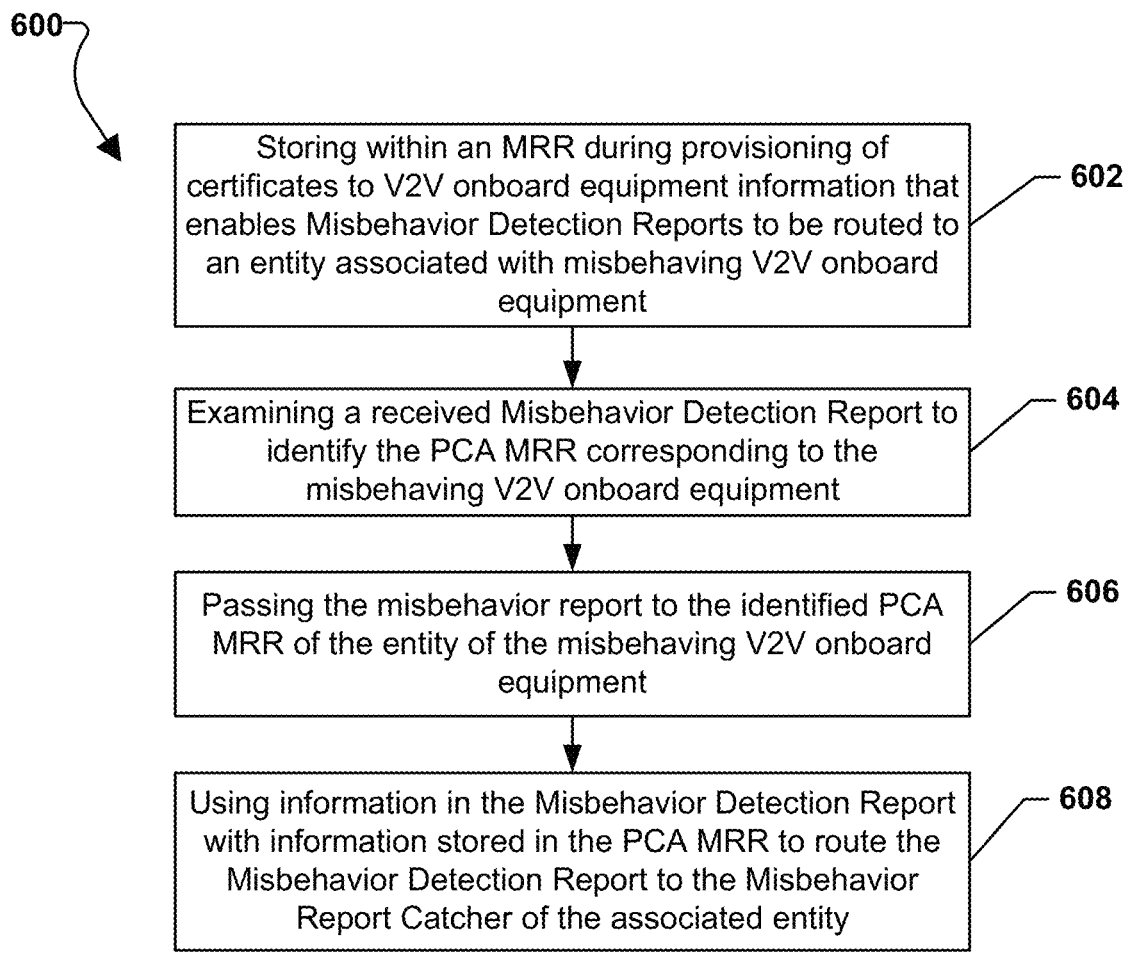
FIG. 6 is a process flow diagram of a method of routing Misbehavior Detection Reports according to various embodiments.

FIG. 6 illustrates a method 600 that may be implemented for routing Misbehavior Detection Reports to the Misbehavior Report Catcher of the appropriate entity (e.g., an OEM) according to various embodiments. In block 602, one or more Misbehavior Report Routers (e.g., a Misbehavior Report Router functionality associated with or implemented within any of the Pseudonym Certificate Authority, Registration Authority, and/or Certificate Provisioning Backend) may store information that allows Misbehavior Detection Reports to be routed to an entity associated with misbehaving V2V onboard equipment.

In block 604, a Misbehavior Report Catcher that receives a Misbehavior Detection Report examines the information within the report to identify the Pseudonym Certificate Authority Misbehavior Report Router corresponding to the misbehaving V2V onboard equipment. Using this information, the receiving Misbehavior Report Catcher may forward the Misbehavior Detection Report to the identified Misbehavior Report Router of the entity of the misbehaving V2V onboard equipment in block 606.

In block 608, the OEM Misbehavior Report Router uses information in the Misbehavior Detection Report with information stored at the time that certificates were provisioned to onboard equipment to route the Misbehavior Detection Report to the Misbehavior Report Catcher of the associated entity.

Figure 7:
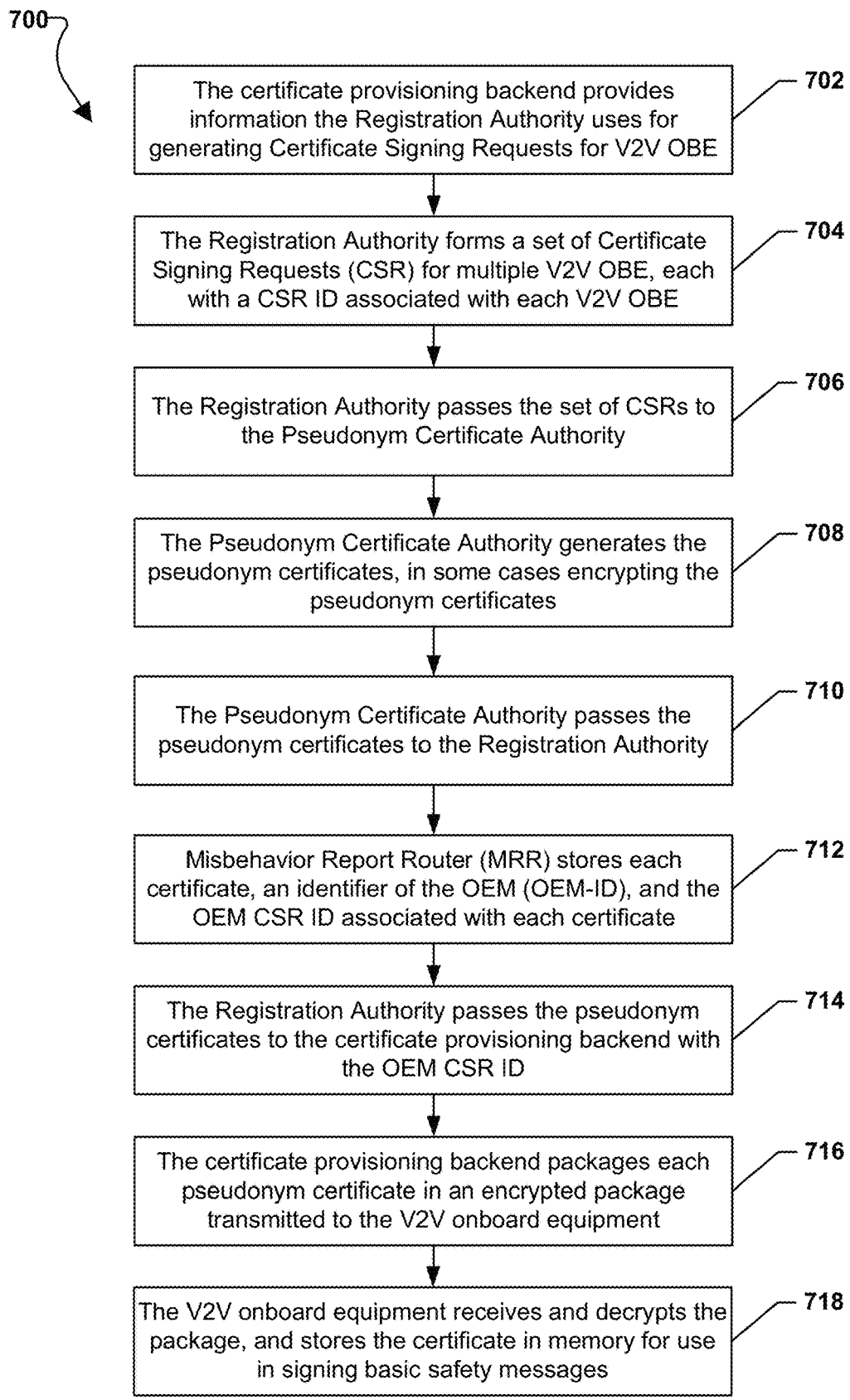
FIG. 7 is a process flow diagram of an example method of provisioning onboard equipment with certificates while storing information in Misbehavior Report Routers sufficient to enable Misbehavior Detection Reports to OEMs according to various embodiments.
Figure 8:
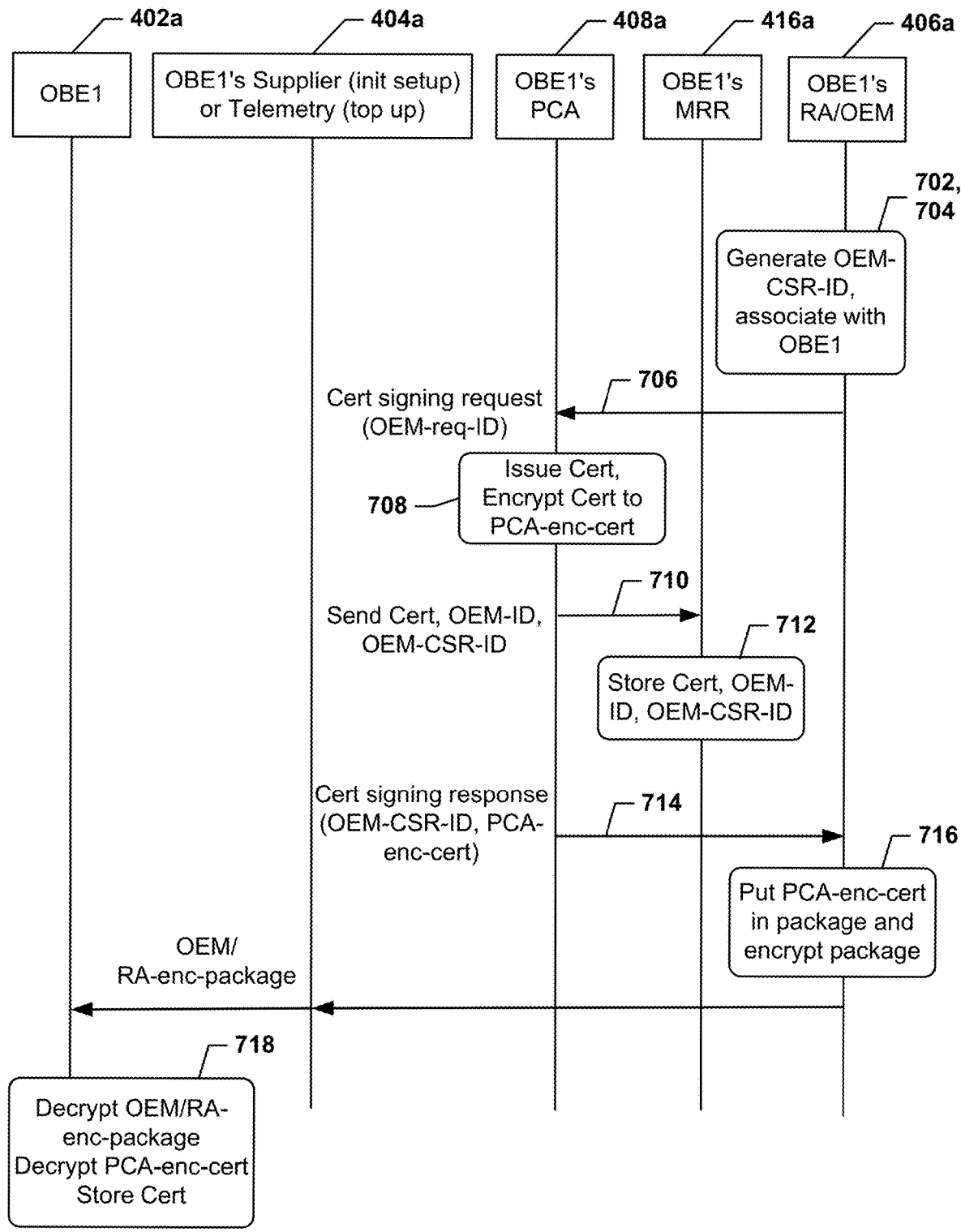
FIGS. 8 and 9 are communication flow diagrams illustrating communications and operations associated with provisioning onboard equipment with certificates while storing information in Misbehavior Report Routers according to some embodiments.
Figure 9:
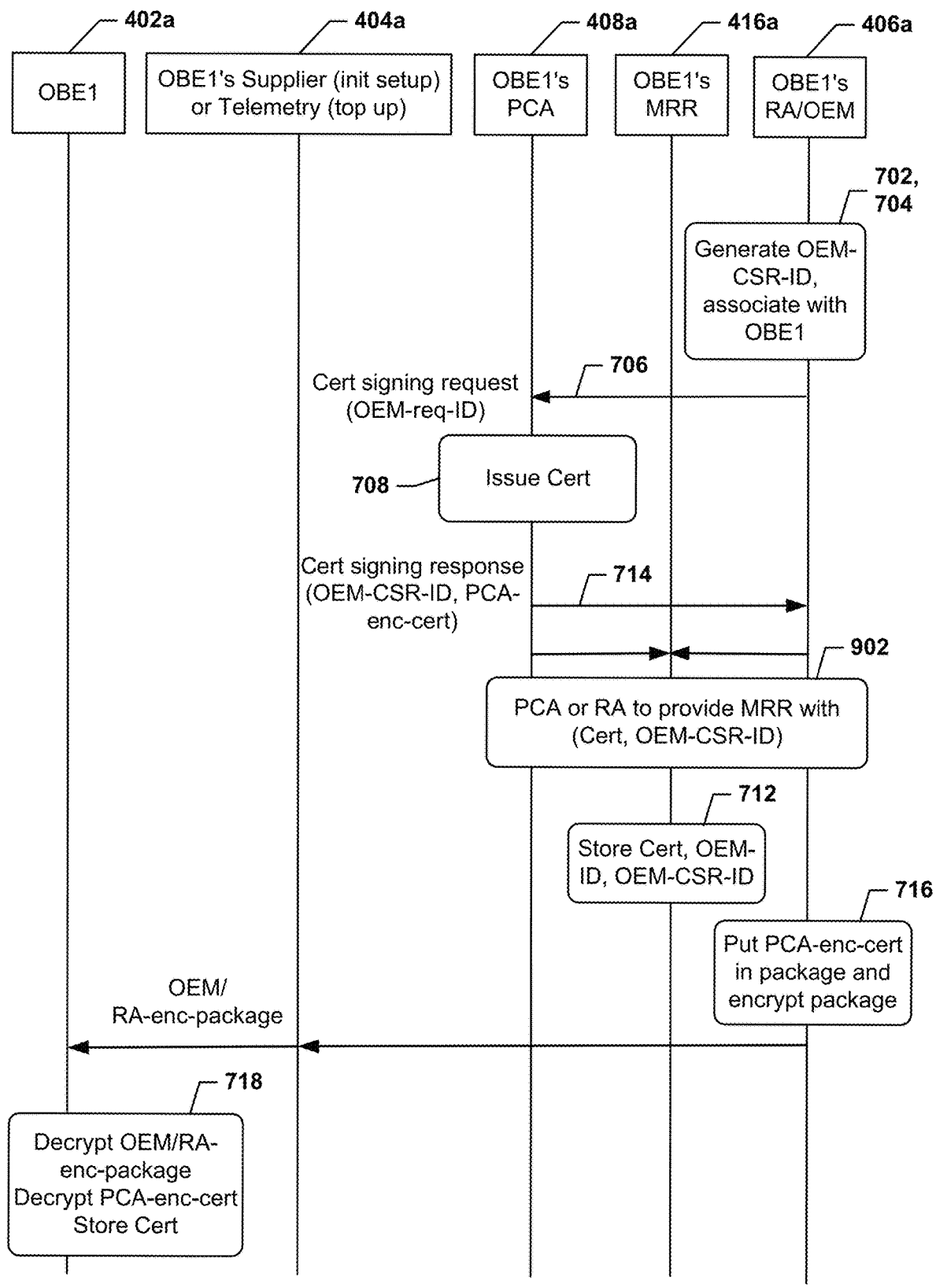

FIG. 7 illustrates a method 700 provisioning certificates to V2V onboard equipment that includes storing of information in Misbehavior Report Routers according to various embodiments. Information flows among the various entities involved in the process when the Pseudonym Certificate Authority 408a supports multiple OEMs each providing their own Registration Authority 406a and Certificate Provisioning Backend 404a are illustrated in FIG. 8. FIG. 9 illustrates the information flows involved in the process when the Pseudonym Certificate Authority 408a, Registration Authority 406a and Certificate Provisioning Backend 404a are associated with a single OEM. References to blocks in the method 700 illustrated in FIG. 7 correspond to like references to operations and communications illustrated in FIGS. 8 and 9.

In block 702, the OEM Certificate Provisioning Backend 404 submits a request a set of Pseudonym Certificates for a V2V onboard equipment to the Registration Authority 406, including a Certificate Provisioning Backend Request Identifier assigned by the Certificate Provisioning Backend.

In block 704, the Registration Authority forms a set of Certificate Signing Requests for multiple V2V onboard equipment, each request including a Certificate Signing Request Identifier.

In block 706, the Registration Authority passes the set of Certificate Signing Requests to a Pseudonym Certificate Authority.

In block 708, the Pseudonym Certificate Authority generates the Pseudonym Certificates. In some cases when the Pseudonym Certificate Authority is a separate entity, the Pseudonym Certificates may be encrypted.

In block 710, the Pseudonym Certificate Authority passes the Pseudonym Certificates to the Registration Authority, along with the Certificate Signing Request Identifier from the corresponding Certificate Signing Request. In circumstances in which the OEM controls the Pseudonym Certificate Authority (see FIG. 9), the Pseudonym Certificate Authority or the Registration Authority may provide the Misbehavior Report Router with the certificate and the Certificate Signing Request identifier (message flow block 902 in FIG. 9).

In block 712, one or more Misbehavior Report Routers stores each certificate an identifier of the OEM, and the identifier of the OEM Certificate Signing Request associated with each certificate. The operations performed in block 712 may be performed at different times during the certificate provisioning process, particularly as the stored information becomes available to a corresponding entity. The information may be stored in respective Misbehavior Report Routers as described above with reference to FIG. 4.

In block 714, the Registration Authority may pass the Pseudonym Certificates to the Certificate Provisioning Backend of the OEM along with the Certificate Provisioning Backend Request Identifier.

In block 716, the Certificate Provisioning Backend packages each the Pseudonym Certificates in an encrypted package that is transmitted or provided to each V2V onboard equipment.

In block 718, the V2V onboard equipment receives and decrypts the package, and stores the certificate in memory for use in signing Basic Safety Messages.

FIG. 8 illustrates information flows among the various entities involved in the process when the Pseudonym Certificate Authority 408a supports multiple OEMs each providing their own Registration Authority 406a and Certificate Provisioning Backend 404a. With reference to FIGS. 7 and 8, in block 702 and 704, OBE1's RA/OEM 406a may request a set of Pseudonym Certificates for a V2V onboard equipment to the OBE1's PCA 408a, and form a set of Certificate Signing Requests for multiple V2V onboard equipment, each request including a Certificate Signing Request Identifier. In block 710, the Pseudonym Certificate Authority passes the Pseudonym Certificates to the Registration Authority, along with the Certificate Signing Request Identifier from the corresponding Certificate Signing Request.

FIG. 9 illustrates example information flows involved when the Pseudonym Certificate Authority 408a, Registration Authority 406a and Certificate Provisioning Backend 404a are associated with a single OEM. References to blocks in the method 700 described with reference to FIG. 7 correspond to like references to operations and communications illustrated in FIGS. 8 and 9. In the example illustrated in FIG. 9, instead of the Pseudonym Certificate Authority passing the Pseudonym Certificates to the Registration Authority in block 710 (as described with reference to FIGS. 7 and 8), the Pseudonym Certificate Authority 408a or the Registration Authority 406a may provide the Misbehavior Report Router 416a with the certificate and the Certificate Signing Request identifier in block 902.

Figure 10:
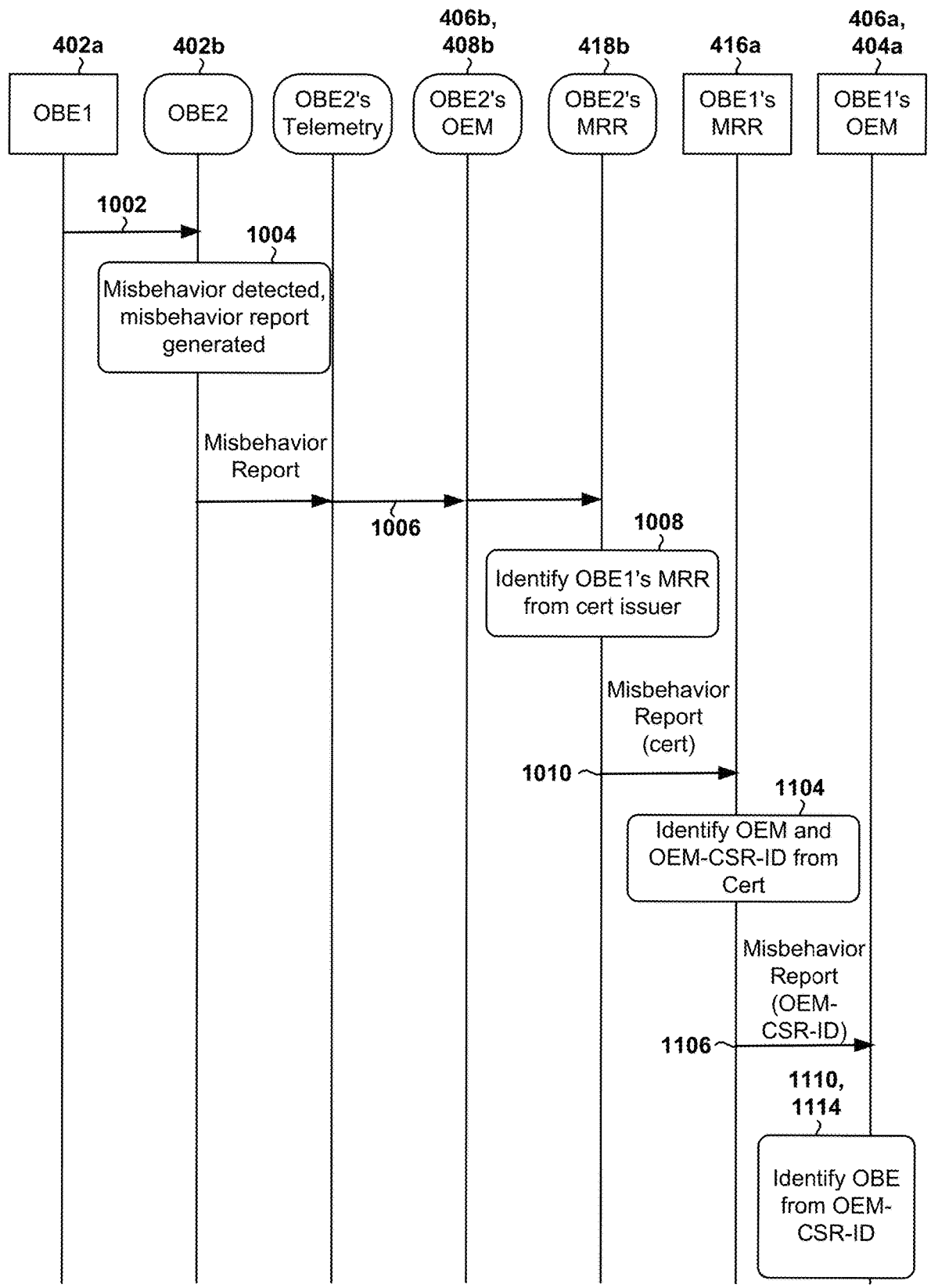
FIG. 10 is a communication flow diagram illustrating communications and operations associated with routing Misbehavior Detection Reports to the appropriate OEM according to various embodiments.
Figure 11:
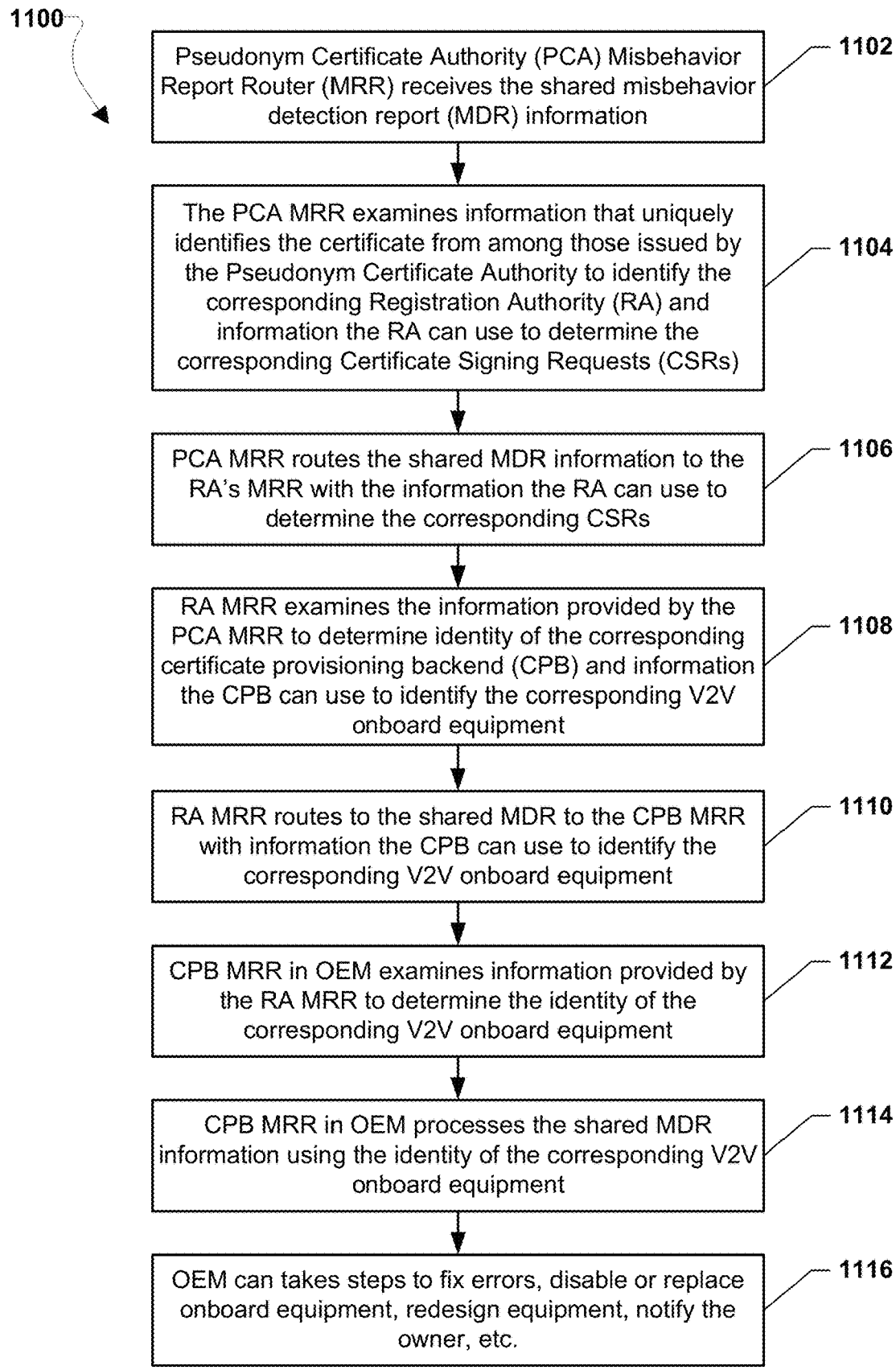
FIG. 11 is a process flow diagram illustrating a method of routing Misbehavior Detection Reports to an OEM with information sufficient to enable the OEM to identify the misbehaving equipment according to various embodiments.

FIGS. 10 and 11 illustrate processes by which Misbehavior Detection Reports may be routed to the appropriate OEM for action according to various embodiments. FIG. 10 illustrates communication flows among the various entities, while FIG. 11 is a process flow diagram of a method 1100 for routing the Misbehavior Detection Reports. References to blocks in the method 1100 illustrated in FIG. 11 correspond to like references to operations and communications illustrated in FIG. 10.

Referring to FIG. 10, a V2V onboard equipment (OBE2) detecting an incorrect Basic Safety Message issued (operation 1002) by another onboard equipment (OBE1 402a) may generate a Misbehavior Detection Report in block 1004. In operations 1006, the reporting V2V equipment (OBE2 402b) may route the Misbehavior Detection Report to a Misbehavior Report Catcher (not shown) provided by or on behalf of OBE2'S OEM component(s) 406b, 408b and to OBE2's MRR 418b. That Misbehavior Report Router (OBE2's MRR 418b) may evaluate information contained within the reported incorrect message to identify the Misbehavior Report Router associated with the misbehaving V2V onboard equipment's OEM in operation block 1008, and route the Misbehavior Detection Report to OBE1's MRR 418a in operation 1010.

With reference to FIG. 11, in block 1102, the Pseudonym Certificate Authority Misbehavior Report Router (OBE1's MRR 416a in FIG. 10) receives the shared Misbehavior Detection Report information, including the identity of the Pseudonym Certificate Authority, and additional information that uniquely identifies the misbehaving V2V onboard equipment Pseudonym Certificate from among those issued by the Pseudonym Certificate Authority. A Pseudonym Certificate Authority Misbehavior Report Router might choose to accept shared Misbehavior Detection Report information only from certain networks or entities that it trusts.

With reference to FIGS. 10 and 11, in block 1104, the Pseudonym Certificate Authority Misbehavior Report Router (OBE1's MRR 416a in FIG. 10) may examine the additional information that uniquely identifies the certificate from among those issued by the Pseudonym Certificate Authority, and determine the identity of the corresponding Registration Authority; and the Registration-Authority-assigned Certificate Signing Request Identifier.

In operation block 1106, the Pseudonym Certificate Authority Misbehavior Report Router (OBE1's MRR 416a in FIG. 10) routes the shared Misbehavior Detection Report information to the Registration Authority's Misbehavior Report Router (OBE1's OEM 406a, 404a in FIG. 10), along with the Certificate Signing Request Identifier.

In block 1108, the Registration Authority Misbehavior Report Router examines the Certificate Signing Request Identifier provided by the Pseudonym Certificate Authority's Misbehavior Report Router, and determines the identity of the corresponding Certificate Provisioning Backend; and the corresponding Certificate-Provisioning-Backend-assigned Certificate Provisioning Backend Request Identifier.

In block 1110, the Registration Authority Misbehavior Report Router (OBE1's OEM 406*a*, 404*a* in FIG. 10) routes the shared Misbehavior Detection Report information to the Certificate Provisioning Backend's Misbehavior Report Router, along with the corresponding Certificate Provisioning Backend Request Identifier.

In block 1112, the Certificate Provisioning Backend Misbehavior Report Router examines the Certificate Provisioning Backend Request Identifier provided by the Registration Authority's Misbehavior Report Router, and determines the identity of the corresponding V2V onboard equipment.

In block 1114, the Certificate Provisioning Backend Misbehavior Report Router (which may be owned or controlled by the OEM) routes the shared Misbehavior Detection Report information and the identity of the corresponding V2V onboard equipment to the OEM's Misbehavior Report Catcher for further processing.

In block 1116, the OEM may take appropriate steps including, but not limited to, any of the following: attempting to fix errors in the update implementation; replacing the V2V onboard equipment; disabling the V2V onboard equipment; notifying the owner to bring in the vehicle for maintenance; deleting certificates from the V2V onboard equipment; placing some of the V2V onboard equipment certificates on a revocation list; issuing new certificates to the V2V onboard equipment. Note that some of these steps require applying actions to the V2V onboard equipment.

In circumstances in which a single party, such as a large OEM, provides more than one of the Certificate Provisioning Backend, Registration Authority and Pseudonym Certificate Authority, the Misbehavior Report Routers for those entities can be merged. For example, the first three options by which parties could provide the Pseudonym Certificate Authority and Registration Authority described above may allow merger of the Misbehavior Report Routers of multiple entities.

In the first option, the OEM could have a single Misbehavior Report Router which associates each issued Pseudonym Certificate directly with the corresponding V2V onboard equipment.

In the second option, the third party provides a Misbehavior Report Router for the Pseudonym Certificate Authority, while the OEM could have a single Misbehavior Report Router which associates each Certificate Signing Requests directly with the corresponding V2V onboard equipment.

The shared Misbehavior Detection Report information could be sent directly from the reporting V2V onboard equipment Pseudonym Certificate Authority Misbehavior Report Router to the Pseudonym Certificate Authority Misbehavior Report Router of the OEM of the misbehaving V2V onboard equipment.

Alternatively, Pseudonym Certificate Authority Misbehavior Report Router entities could form a mesh network, with shared Misbehavior Detection Report information potentially being passed from the reporting V2V onboard equipment Pseudonym Certificate Authority Misbehavior Report Router via other Pseudonym Certificate Authority Misbehavior Report Routers before reaching the Pseudonym Certificate Authority Misbehavior Report Router of the V2V onboard equipment OEM.

The generation of the shared Misbehavior Detection Report information from the Misbehavior Detection Report may occur at the Misbehavior Report Catcher, Certificate Provisioning Backend Misbehavior Report Router. Alternatively, the generation of the shared Misbehavior Detection Report information from the Misbehavior Detection Report may occur at the Registration Authority Misbehavior Report Router or Pseudonym Certificate Authority Misbehavior Report Router of the reporting V2V onboard equipment. As a further alternative, the generation of the shared Misbehavior Detection Report information from the Misbehavior Detection Report may be generated progressively as passed up the hierarchy.

The various embodiments provide the ability for an OEM to receive shared Misbehavior Detection Report information about its V2V onboard equipment, even when the corresponding Misbehavior Detection Reports were issued by V2V onboard equipment of other OEMs. This information can be useful to an OEM. In some cases, the OEM may want the information purely for recording statistics. In other cases, the OEM may take appropriate steps. The system builds on the existing infrastructure described in Secure Credential Management System. The various embodiments allow simplifications when parties provide multiple entities of the Secure Credential Management System.

Various embodiments include methods of routing Misbehavior Detection Reports from vehicle-to-vehicle (V2V) onboard equipment to an associated original equipment manufacturer (OEM). In some embodiments, the methods may include routing a misbehavior detection report to the OEM associated with a V2V onboard equipment based on a combination of information stored in a misbehavior report router during or resulting from a provisioning of a certificate to the V2V onboard equipment (e.g., information stored in the Pseudonym Certificate Authority Misbehavior Report Router, etc.) and information included in a misbehavior detection report received from the V2V onboard equipment (e.g., information in the Misbehavior Detection Report, etc.).

In some embodiments, the methods may include storing, within a Misbehavior Report Router during or resulting from provisioning of a certificate to a V2V onboard equipment, information that enables a Misbehavior Detection Report to be routed to the OEM associated with or responsible for the V2V onboard equipment, examining a Misbehavior Detection Report received from a reporting V2V onboard equipment to identify a Pseudonym Certificate Authority Misbehavior Report Router of the OEM associated with misbehaving V2V onboard equipment, passing the Misbehavior Detection Report to the identified Pseudonym Certificate Authority Misbehavior Report Router, and using information in the Misbehavior Detection Report with information stored in the Pseudonym Certificate Authority Misbehavior Report Router to route the Misbehavior Detection Report to the associated or responsible OEM.

In some embodiments, using information in the Misbehavior Detection Report, with information stored in the Pseudonym Certificate Authority Misbehavior Report Router, to route the Misbehavior Detection Report to the associated OEM may be accomplished by performing operations that include examining information that uniquely identifies the certificate from among those issued by the Pseudonym Certificate Authority to identify the corresponding Registration Authority and information the Registration Authority can use to determine the corresponding Certificate Signing Requests, routing the Misbehavior Detection Report information to the Registration Authority with information the Registration Authority can use to determine a corresponding certification signing request, examining in the Registration Authority the provided information to identify a corresponding Certificate Provisioning Backend and information the corresponding Certificate Provisioning Backend can use to identify the corresponding V2V onboard equipment, routing to the corresponding Certificate Provisioning Backend the Misbehavior Detection Report information and the information the corresponding Certificate Provisioning Backend can use to identify the corresponding V2V onboard equipment, examining in the corresponding Certificate Provisioning Backend the received information to determine the identity of the corresponding V2V onboard equipment, and providing in the Misbehavior Detection Report information the identity of the corresponding V2V onboard equipment to the OEM.

In some embodiments, routing the misbehavior detection report to the OEM associated with the V2V onboard equipment may include identifying a registration authority and a certificate signing request identifier (or other information the Registration Authority can use to determine corresponding Certificate Signing Requests) based on information that uniquely identifies the certificate from among those issued by the Pseudonym Certificate Authority.

In some embodiments, storing, within a Misbehavior Report Router during or resulting from provisioning of a certificate to a V2V onboard equipment, information that enables a Misbehavior Detection Report to be routed to the OEM associated with misbehaving V2V onboard equipment may include storing in a Pseudonym Certificate Authority Misbehavior Report Router for each certificate information identifying the Registration Authority that sent the Certificate Signing Request that initiated generation of the certificate and information the Registration Authority can use to identify that individual Certificate Signing Request, storing in a Registration Authority Misbehavior Report Router for each information that the Registration Authority can use to identify that individual Certificate Signing Request information identifying the OEM Certificate Provisioning Backend that requested the certification and information that the Certificate Provisioning Backend can use to identify the associated V2V onboard equipment, and storing in a Certificate Provisioning Backend Misbehavior Report Router information that can be used to identify the associated V2V onboard equipment.

In the various embodiments, one or more processors in one or more server computing devices associated with the OEM may be configured or equipped with a pseudonym certificate authority, a registration authority, and/or a certificate provisioning backend. In some embodiments, the pseudonym certificate authority, the registration authority, certificate provisioning backend, and/or any of the other components illustrated and described with FIGS. 1-11 may be a computer-related entity, such as, but not limited to, hardware, firmware, a combination of hardware and software, software, or software in execution, which are configured to perform particular operations or functions. For example, a pseudonym certificate authority may be, but is not limited to, a process running on a server processor, a server processor, a program executing on a server computing device, a server computing device, a server executing on commodity hardware, a virtual server running on a cloud computing system, etc. In addition, these components (e.g., pseudonym certificate authority, the registration authority, certificate provisioning backend, etc.) may execute from various non-transitory computer readable media having various instructions and/or data structures stored thereon. The components may communicate by way of local and/or remote processes, function or procedure calls, electronic signals, data packets, memory read/writes, and other known network, computer, processor, and/or process related communication methodologies.

In some embodiments, the Pseudonym Certificate Authority, Registration Authority and Certificate Provisioning Backend may be owned or controlled by the OEM.

In some embodiments, the Registration Authority and Certificate Provisioning Backend may be owned or controlled by the OEM, and the Pseudonym Certificate Authority, Registration Authority may be owned or controlled by a third-party.

In some embodiments, the Certificate Provisioning Backend may be owned or controlled by the OEM, and the Pseudonym Certificate Authority and Registration Authority may be owned or controlled by a third-party.

In some embodiments, the Certificate Provisioning Backend may be owned or controlled by the OEM, the Registration Authority may be owned or controlled by a third-party, and the Pseudonym Certificate Authority may be owned or controlled by a different third-party (a "fourth-party").

Figure 12:
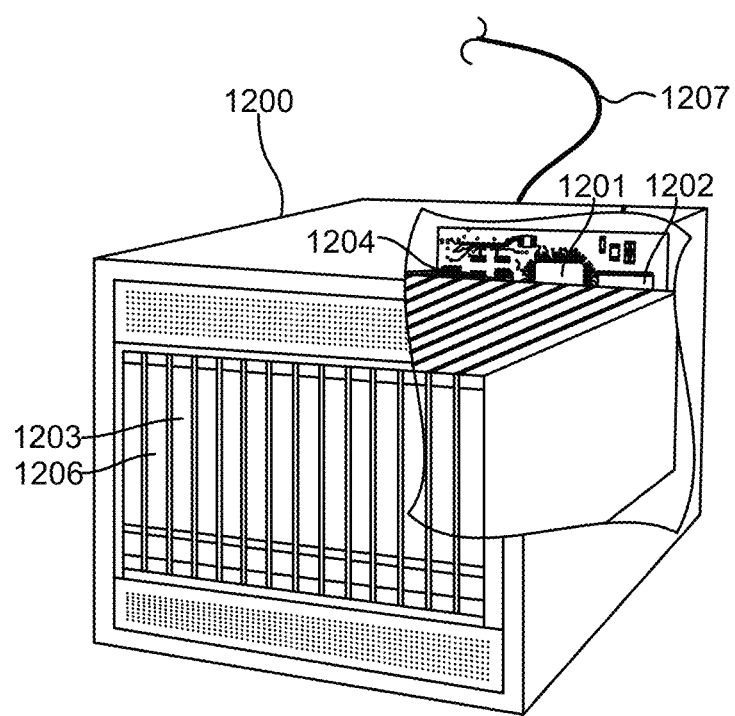
FIG. 12 is a schematic diagram of an example server suitable for implementing various embodiments.

The various embodiments (including, but not limited to, embodiments discussed above with reference to FIGS. 1-11) may also be implemented in a combination of a variety of commercially available server devices, such as the server 1200 illustrated in FIG. 12. Such a server 1200 typically includes a processor 1201 coupled to volatile memory 1202 and a large capacity nonvolatile memory, such as a disk drive 1204. The server 1200 may also include a floppy disc drive, compact disc (CD) or digital versatile disc (DVD) disc drive 1206 coupled to the processor 1201. The server 1200 may also include one or more wired or wireless network transceivers 1203, such one or more network access ports and/or wired or wireless modems (e.g., one wireless modem, two wireless modems, three wireless modems, four wireless modems, or more than four wireless modems), coupled to the processor 1201 for establishing network interface connections with one or more communication networks 1207, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

The processor 1201 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 1201. The processor 1201 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 1201 including internal memory or removable memory plugged into the device and memory within the processor 1201.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of routing a misbehavior detection report associated with a first vehicle-to-everything (V2X) onboard equipment of a first vehicle to a first entity associated with the first V2X onboard equipment, the method comprising:
   receiving a misbehavior detection report associated with the first V2X onboard equipment from a misbehavior report catcher server associated with a second V2X onboard equipment of a second vehicle that generated the misbehavior detection report; and
   routing the misbehavior detection report to the first entity associated with the first V2X onboard equipment based on a combination of:
      information stored in a misbehavior report router (MRR) resulting from a provisioning of a certificate to the first V2X onboard equipment; and
      information included in the misbehavior detection report.

2. The method of claim 1, wherein routing the misbehavior detection report to the first entity associated with the first V2X onboard equipment based on the combination of the information stored in the MRR resulting from the provisioning of the certificate to the first V2X onboard equipment and the information included in the misbehavior detection report comprises routing the misbehavior detection report based on at least one of:
   the certificate issued to the first V2X onboard equipment;
   an identity of a registration authority or entity that requested the provisioning of the certificate; or
   a certificate signing request identifier.

3. The method of claim 1, wherein routing the misbehavior detection report to the first entity associated with the first V2X onboard equipment based on the combination of the information stored in the MRR resulting from the provisioning of the certificate to the first V2X onboard equipment and the information included in the misbehavior detection report comprises routing the misbehavior detection report based on pseudonym certificate information stored resulting from the provisioning of the certificate to the first V2X onboard equipment.

4. The method of claim 1, further comprising:
   storing, resulting from the provisioning of the certificate to the first V2X onboard equipment, information that enables the misbehavior detection report to be routed to the first entity associated with the first V2X onboard equipment.

5. The method of claim 4, wherein storing, resulting from the provisioning of the certificate to the first V2X onboard equipment, the information that enables the misbehavior detection report to be routed to the first entity associated with the first V2X onboard equipment comprises:
storing in a pseudonym certificate authority MRR for each of a plurality of certificates:
information identifying a registration authority that sent a certificate signing request (CSR) that initiated generation of the certificate; and
a CSR identifier that identifies the CSR to the registration authority.

6. The method of claim 4, wherein storing, resulting from the provisioning of the certificate to the first V2X onboard equipment, the information that enables the misbehavior detection report to be routed to the first entity associated with the first V2X onboard equipment further comprises:
storing in a registration authority MRR for each of a plurality of certificate signing request (CSR) identifiers:
information identifying a certificate provisioning backend that requested the certificate; and
an onboard equipment identifier that identifies the first V2X onboard equipment to the certificate provisioning backend.

7. The method of claim 4, wherein storing, resulting from the provisioning of the certificate to the first V2X onboard equipment, the information that enables the misbehavior detection report to be routed to the first entity associated with the first V2X onboard equipment further comprises:
storing in a certificate provisioning backend MRR an onboard equipment identifier that identifies the first V2X onboard equipment to a certificate provisioning backend.

8. The method of claim 1, wherein routing the misbehavior detection report to the first entity associated with the first V2X onboard equipment based on the combination of the information stored in the MRR resulting from the provisioning of the certificate to the first V2X onboard equipment and the information included in the misbehavior detection report comprises:
identifying a registration authority, and a certificate signing request (CSR) identifier that identifies a corresponding CSR to the registration authority;
routing the misbehavior detection report and CSR identifier to the registration authority, the registration authority identifying a certificate provisioning backend and an onboard equipment identifier that identifies the first V2X onboard equipment;
routing the misbehavior detection report and the onboard equipment identifier to the certificate provisioning backend;
determining an identity of the first V2X onboard equipment based on the misbehavior detection report and the onboard equipment identifier received in the certificate provisioning backend; and
sending the determined identity of the first V2X onboard equipment to the first entity.

9. A server computing device for routing a misbehavior detection report associated with a first vehicle-to-everything (V2X) onboard equipment of a first vehicle to a first entity associated with the first V2X onboard equipment, comprising:
a processor configured with processor-executable software instructions to perform operations comprising:
receiving a misbehavior detection report associated with the first V2X onboard equipment from a misbehavior report catcher server associated with a second V2X onboard equipment of a second vehicle that generated the misbehavior detection report; and
routing the misbehavior detection report to the first entity associated with the first vehicle-to-everything (V2X) onboard equipment based on a combination of:
information stored in memory resulting from a provisioning of a certificate to the first V2X onboard equipment; and
information included in the misbehavior detection report.

10. The server computing device of claim 9, wherein the processor is configured with processor-executable software instructions to perform operations such that routing the misbehavior detection report to the first entity associated with the first V2X onboard equipment based on the combination of the information stored in memory resulting from the provisioning of the certificate to the first V2X onboard equipment and the information included in the misbehavior detection report comprises routing the misbehavior detection report to the first entity associated with the first V2X onboard equipment based on at least one of:
the certificate issued to the first V2X onboard equipment;
an identity of a registration authority or entity that requested the provisioning of the certificate; or
a certificate signing request identifier.

11. The server computing device of claim 9, wherein the processor is configured with processor-executable software instructions to perform operations such that routing the misbehavior detection report to the first entity associated with the first V2X onboard equipment based on the combination of the information stored in memory resulting from the provisioning of the certificate to the first V2X onboard equipment and the information included in the misbehavior detection report comprises routing the misbehavior detection report to the first entity associated with the first V2X onboard equipment based on pseudonym certificate information stored resulting from the provisioning of the certificate to the first V2X onboard equipment.

12. The server computing device of claim 9, wherein the processor is configured with processor-executable software instructions to perform operations further comprising:
storing, resulting from the provisioning of the certificate to the first V2X onboard equipment, information that enables the misbehavior detection report to be routed to the first entity associated with the first V2X onboard equipment.

13. The server computing device of claim 9, wherein the processor is configured with processor-executable software instructions to perform operations such that routing the misbehavior detection report to the first entity associated with the first V2X onboard equipment comprises:
receiving, in a pseudonym certificate authority executing on the server computing device, the misbehavior detection report;
identifying, by the pseudonym certificate authority executing on the server computing device, a pseudonym certificate associated with received misbehavior detection report;
identifying, by the pseudonym certificate authority executing on the server computing device, a registration authority that sent a certificate signing request (CSR) that initiated generation of the pseudonym certificate and a certificate signing request identifier (CSR ID) of the CSR, and
sending, by the pseudonym certificate authority executing on the server computing device, the CSR ID and the received misbehavior detection report to the identified registration authority.

14. The server computing device of claim 9, wherein the processor is configured with processor-executable software instructions to perform operations such that routing the misbehavior detection report to the first entity associated with the first V2X onboard equipment further comprises:
- identifying a pseudonym certificate associated with the received misbehavior detection report;
- determining a certificate provisioning backend request identifier (CPB Request ID) associated with the received misbehavior detection report;
- determining, an onboard equipment identifier of the first V2X onboard equipment based on the CPB Request ID; and
- sending the onboard equipment identifier and the received misbehavior detection report to a misbehavior report catcher server of the first entity.

15. The server computing device of claim 9, wherein the processor is configured with processor-executable software instructions to perform operations such that routing the misbehavior detection report to the first entity associated with the first V2X onboard equipment comprises:
- receiving, in a registration authority executing on the server computing device, a certificate signing request identifier (CSR ID) and the misbehavior detection report;
- determining, by the registration authority executing on the server computing device, a certificate provisioning backend request identifier of a certificate provisioning backend that requested a certificate for the received misbehavior detection report;
- determining, by the registration authority executing on the server computing device, an onboard equipment identifier that identifies the first V2X onboard equipment to the certificate provisioning backend; and
- sending, by the registration authority executing on the server computing device, the onboard equipment identifier and the received misbehavior detection report to the certificate provisioning backend.

16. The server computing device of claim 9, wherein the processor is configured with processor-executable software instructions to perform operations such that routing the misbehavior detection report to the first entity associated with the first V2X onboard equipment comprises:
- receiving, in a certificate provisioning backend executing on the server computing device, a certificate provisioning backend request identifier (CPB Request ID) and the misbehavior detection report;
- determining, by the certificate provisioning backend executing on the server computing device, an onboard equipment identifier of the first V2X onboard equipment based on the received CPB Request ID; and
- sending, by the certificate provisioning backend executing on the server computing device, the onboard equipment identifier and the received misbehavior detection report to a misbehavior report catcher of the first entity.

17. A non-transitory processor-readable storage medium having stored thereon processor-executable instructions configured to cause a processor of a server computing device to perform operations for routing a misbehavior detection report associated with a first vehicle-to-everything (V2X) onboard equipment of a first vehicle to a first entity associated with the first V2X onboard equipment, the operations comprising:
- receiving a misbehavior detection report associated with the first V2X onboard equipment from a misbehavior report catcher server associated with a second V2X onboard equipment of a second vehicle that generated the misbehavior detection report; and
- routing the misbehavior detection report to the first entity associated with the first V2X onboard equipment based on a combination of:
  - information stored in a misbehavior report router (MRR) resulting from a provisioning of a certificate to the first V2X onboard equipment; and
  - information included in the misbehavior detection report.

18. The non-transitory processor-readable storage medium of claim 17, wherein the stored processor-executable instructions are configured to cause a processor to perform operations such that routing the misbehavior detection report to the first entity associated with the first V2X onboard equipment based on the combination of the information stored resulting from the provisioning of the certificate to the first V2X onboard equipment and the information included in the misbehavior detection report comprises routing the misbehavior detection report based on at least one of:
- the certificate issued to the first V2X onboard equipment;
- an identity of a registration authority or entity that requested the provisioning of the certificate; or
- a certificate signing request identifier.

19. The non-transitory processor-readable storage medium of claim 17, wherein the stored processor-executable instructions are configured to cause a processor to perform operations such that routing the misbehavior detection report to the first entity associated with the first V2X onboard equipment based on the combination of the information stored resulting from the provisioning of the certificate to the first V2X onboard equipment and the information included in the misbehavior detection report comprises routing the misbehavior detection report based on pseudonym certificate information stored resulting from the provisioning of the certificate to the first V2X onboard equipment.

20. The non-transitory processor-readable storage medium of claim 17, wherein the stored processor-executable instructions are configured to cause a processor to perform operations comprising:
- storing, resulting from the provisioning of the certificate to the first V2X onboard equipment, information that enables the misbehavior detection report to be routed to the first entity associated with the first V2X onboard equipment.

21. The non-transitory processor-readable storage medium of claim 17, wherein the stored processor-executable instructions are configured to cause a processor to perform operations such that routing the misbehavior detection report to the first entity associated with the first V2X onboard equipment comprises:
- receiving, in a pseudonym certificate authority executing on the server computing device, the misbehavior detection report;
- identifying, by the pseudonym certificate authority executing on the server computing device, a pseudonym certificate associated with the received misbehavior detection report;
- identifying, by the pseudonym certificate authority executing on the server computing device, a registration authority that sent a certificate signing request (CSR) that initiated generation of the pseudonym certificate and a certificate signing request identifier (CSR ID) of the CSR, and sending, by the pseudonym certificate authority executing on the server computing device, the CSR ID and the received misbehavior detection report to the identified registration authority.

22. The non-transitory processor-readable storage medium of claim 17, wherein the stored processor-executable instructions are configured to cause a processor to perform operations such that routing the misbehavior detection report to the first entity associated with the first V2X onboard equipment comprises:
   receiving, in a registration authority executing on the server computing device, a certificate signing request identifier (CSR ID) and the misbehavior detection report;
   determining, by the registration authority executing on the server computing device, a certificate provisioning backend request identifier of a certificate provisioning backend that requested a certificate for the received misbehavior detection report;
   determining, by the registration authority executing on the server computing device, an onboard equipment identifier that identifies the first V2X onboard equipment to the certificate provisioning backend; and
   sending, by the registration authority executing on the server computing device, the onboard equipment identifier and the received misbehavior detection report to the certificate provisioning backend.

23. The non-transitory processor-readable storage medium of claim 17, wherein the stored processor-executable instructions are configured to cause a processor to perform operations such that routing the misbehavior detection report to the first entity associated with the first V2X onboard equipment comprises:
   receiving, in a certificate provisioning backend executing on the server computing device, a certificate provisioning backend request identifier (CPB Request ID) and the misbehavior detection report;
   determining, by the certificate provisioning backend executing on the server computing device, an onboard equipment identifier of the first V2X onboard equipment based on the CPB Request ID; and
   sending, by the certificate provisioning backend executing on the server computing device, the onboard equipment identifier and the received misbehavior detection report to a misbehavior report catcher of the first entity.

24. A server computing device for routing a misbehavior detection report associated with a first vehicle-to-everything (V2X) onboard equipment of a first vehicle to a first entity associated with the first V2X onboard equipment, comprising:
   means for receiving, in a pseudonym certificate authority executing on the server computing device, a misbehavior detection report associated with the first V2X onboard equipment from a misbehavior report catcher server associated with a second V2X onboard equipment of a second vehicle that generated the misbehavior detection report; and
   means for routing the received misbehavior detection report to the first entity associated with the first V2X onboard equipment based on a combination of:
      information stored in a misbehavior report router (MRR) resulting from a provisioning of a certificate to the first V2X onboard equipment; and
      information included in the misbehavior detection report.

25. The server computing device of claim 24, wherein means for routing the misbehavior detection report to the first entity associated with the first V2X onboard equipment comprises:
   means for routing the misbehavior detection report based on at least one of:
      the certificate issued to the first V2X onboard equipment;
      an identity of a registration authority or entity that requested the provisioning of the certificate; or
      a certificate signing request identifier.

26. The server computing device of claim 24, wherein means for routing the misbehavior detection report to the first entity associated with the first V2X onboard equipment comprises means for routing the misbehavior detection report based on pseudonym certificate information stored resulting from the provisioning of the certificate to the first V2X onboard equipment.

27. The server computing device of claim 24, further comprising:
   means for storing, resulting from the provisioning of the certificate to the first V2X onboard equipment, information that enables the misbehavior detection report to be routed to the first entity associated with the first V2X onboard equipment.

28. The server computing device of claim 24, wherein means for routing the misbehavior detection report to the first entity associated with the first V2X onboard equipment comprises:
   means for identifying, by the pseudonym certificate authority executing on the server computing device, a pseudonym certificate associated with received misbehavior detection report;
   means for identifying, by the pseudonym certificate authority executing on the server computing device, a registration authority that sent a certificate signing request (CSR) that initiated generation of the pseudonym certificate and a certificate signing request identifier (CSR ID) of the CSR, and
   means for sending, by the pseudonym certificate authority executing on the server computing device, the CSR ID and the received misbehavior detection report to the identified registration authority.

29. The server computing device of claim 24, wherein means for routing the misbehavior detection report to the first entity associated with the first V2X onboard equipment comprises:
   means for receiving, in a registration authority executing on the server computing device, a certificate signing request identifier (CSR ID) and the misbehavior detection report;
   means for determining, by the registration authority executing on the server computing device, a certificate provisioning backend request identifier of a certificate provisioning backend that requested a certificate for the received misbehavior detection report;
   means for determining, by the registration authority executing on the server computing device, an onboard equipment identifier that identifies the first V2X onboard equipment to the certificate provisioning backend; and
   means for sending, by the registration authority executing on the server computing device, the onboard equipment identifier and the received misbehavior detection report to the certificate provisioning backend.

30. The server computing device of claim 24, wherein means for routing the misbehavior detection report to the first entity associated with the first V2X onboard equipment comprises:
- means for receiving, in a certificate provisioning backend executing on the server computing device, a certificate provisioning backend request identifier (CPB Request ID) and the misbehavior detection report;
- means for determining, by the certificate provisioning backend executing on the server computing device, an onboard equipment identifier of the first V2X onboard equipment based on the CPB Request ID; and
- means for sending, by the certificate provisioning backend executing on the server computing device, the onboard equipment identifier and the received misbehavior detection report to a misbehavior report catcher of the first entity.

* * * * *